(12) United States Patent
Mcgann et al.

(10) Patent No.: US 11,134,153 B2
(45) Date of Patent: Sep. 28, 2021

(54) SYSTEM AND METHOD FOR MANAGING A DIALOG BETWEEN A CONTACT CENTER SYSTEM AND A USER THEREOF

(71) Applicant: GENESYS TELECOMMUNICATIONS LABORATORIES, INC., Daly City, CA (US)

(72) Inventors: Conor Mcgann, Daly City, CA (US); Canice Lambe, Dublin (IE); Felix Immanuel Wyss, Noblesville, IN (US); Wenjin Gu, Markham (CA); Simon Doyle, Galway (IE); Michael Orr, Belfast (GB); Patrick Breslin, Galway (IE)

( * ) Notice: Subject to any disclaimer, the term of this patent is extended or adjusted under 35 U.S.C. 154(b) by 0 days.

(21) Appl. No.: 17/098,673

(22) Filed: Nov. 16, 2020

(65) Prior Publication Data

US 2021/0160372 A1 May 27, 2021

Related U.S. Application Data

(62) Division of application No. 17/098,621, filed on Nov. 16, 2020.

(60) Provisional application No. 62/938,951, filed on Nov. 22, 2019.

(51) Int. Cl.
| | |
|---|---|
| *H04M 3/00* | (2006.01) |
| *H04M 3/51* | (2006.01) |
| *G06F 40/35* | (2020.01) |
| *H04M 3/523* | (2006.01) |
| *G06F 40/30* | (2020.01) |

(52) U.S. Cl.
CPC .......... *H04M 3/5183* (2013.01); *G06F 40/30* (2020.01); *G06F 40/35* (2020.01); *H04M 3/5175* (2013.01); *H04M 3/5237* (2013.01)

(58) Field of Classification Search
CPC .................................................. H04M 3/5183
USPC ...... 379/265.01–265.14, 266.01–266.1, 309, 379/67.1–88.28
See application file for complete search history.

(56) References Cited

U.S. PATENT DOCUMENTS 9,214,001 B2 * 12/2015 Rawle ............ G06Q 10/063112
10,104,232 B2 * 10/2018 Marrelli .............. H04M 3/5175
2005/0165607 A1 * 7/2005 Di Fabbrizio .......... G06F 40/30
704/256

(Continued)

OTHER PUBLICATIONS

PCT Search Report and Written Opinion for co-pending PCT application PCT/US2020/060688 completed on Feb. 19, 2021.

(Continued)

*Primary Examiner* — William J Deane, Jr.

(57) ABSTRACT

A processor receives inputs from a dialog between an agent and a user performed over a communication channel A knowledge base is stored, comprising entries with a subset of said entries defined as higher priority. A match is detected between an input from said dialog and a plurality of said knowledge base entries. At least one of said plurality of entries is retrieved corresponding to said match. The at least one of said plurality of entries is pushed as an output to one or more of a device operated by said user and at least one device operated by one of said user and said agent. A further match is detected between an input from said dialog and a higher priority entry in said knowledge base and pushed to said at least one device while the dialog is ongoing.

10 Claims, 12 Drawing Sheets

(56) References Cited

U.S. PATENT DOCUMENTS

| | | | |
|---|---|---|---|
| 2009/0018829 A1* | 1/2009 | Kuperstein | G10L 15/26 704/235 |
| 2012/0053945 A1* | 3/2012 | Gupta | G10L 15/22 704/256 |
| 2015/0228275 A1* | 8/2015 | Watanabe | G10L 15/22 704/275 |
| 2016/0379637 A1* | 12/2016 | Crook | G10L 15/22 704/275 |
| 2017/0286396 A1* | 10/2017 | Sandor | G06F 40/35 |
| 2018/0338041 A1 | 11/2018 | McGann et al. | |

OTHER PUBLICATIONS

"Behavior Tree (artificial intelligence, robotics and control)", Aug. 3, 2019, XP055778053, Retrieved from the Internet: URL: https://en.wikipedia.org/w/index.php?title=Behavior_tree_(artificial_intelligence,_robotics_and_control)&oldid=909156219.

* cited by examiner

SYSTEM AND METHOD FOR MANAGING A DIALOG BETWEEN A CONTACT CENTER SYSTEM AND A USER THEREOF

CROSS REFERENCE TO RELATED APPLICATION

This application is a divisional application of U.S. patent application Ser. No. 17/098,621, also titled "SYSTEM AND METHOD FOR MANAGING A DIALOG BETWEEN A CONTACT CENTER SYSTEM AND A USER THEREOF", filed in the U.S. Patent and Trademark Office on Nov. 16, 2020, and further claims the benefit of U.S. Provisional Patent Application No. 62/938,951, titled "SYSTEM AND METHOD FOR MANAGING A DIALOG BETWEEN A CONTACT CENTER SYSTEM AND A USER THEREOF", filed in the U.S. Patent and Trademark Office on Nov. 22, 2019, the contents of which are incorporated herein.

BACKGROUND

The present invention generally relates to telecommunications systems and methods. More particularly, the present invention pertains to the operation of contact centers and the management of dialogs therein.

In the operation of many contact centers, interactions with users and between users (which term includes agents of the contact center, customers or external parties communicating with the contact center, and automated systems of the contact center which participate in communications with other users) are managed according to dialogs. Such dialogs are sequences of inputs and outputs within the context of a communications session.

In its simplest form, and is well known, a dialog may take the form of a script employed by a contact center agent to manage a conversation with an external party. The script is written with certain objectives in mind, such as to ensure a satisfactory interaction, to make a sale or offer a service, or to efficiently handle an interaction with the external party. Such scripts suffer from the disadvantage that they are relatively rigid and inflexible.

A further drawback with this approach arises when attempting to automate the execution of the script, e.g. in order to create a series of prompts to an agent workstation where the presentation of prompts is dependent on the progress of the interaction to date. It can be difficult or even impossible to anticipate how a particular interaction might develop, either due to responses or questions that are not anticipated or simply because the vagaries of human interaction can lead a party to jump between topics that are individually catered for within the script but where there is no functional link from one topic to another.

The conventional approach to automation of dialogs in a contact center is to employ a finite state machine (FSM) to manage the dialog. Such a model envisages a series of states (namely the current point in the dialog or script determining the prompt(s) to be presented to the agent) and associated transitions defining one or more actions to be executed when a condition is fulfilled or when an event is detected, such as to move execution to another state, or to trigger an automated contact center system, or terminate the dialog for example. Satisfactory operation of a dialog using the FSM paradigm presupposes that all transitions are properly modeled, i.e. at a given point in the dialog the inputs and events received will map to an appropriate next step. For the reasons already mentioned, real-world interactions and conversations often depart from their expected course, and FSM models can break if there is no defined transition for a given event or input. This can lead to the agent being deprived of any useful prompt, with the script either falling back to a generic fallback point or incorrectly moving forward to a prompt which is not appropriate to the input for lack of a better transition.

SUMMARY

A system and method are presented for managing a dialog between a contact center system and a user thereof. In one embodiment, there is provided a computer-implemented method for managing a dialog between a contact center system and a user thereof, comprising the steps of: storing a root behavior tree comprising at least one flow control node and a plurality of child nodes, said at least one flow control node determining a sequence of execution of said child nodes; storing at least one first-level behavior tree which may be executed to accomplish a task having an associated intent, wherein said at least one first-level behavior tree is a child node of the root behavior tree and wherein said at least one first-level behavior tree includes nodes which define actions to be performed by a component of the contact center system; hosting a dialog between said contact center and said user thereof, wherein the dialog is performed over a communication channel between the user and a component of the contact center; receiving, by a processor, inputs from said dialog; executing the root behavior tree and said at least one first-level behavior tree as a child node of the root behavior tree in response to said inputs; detecting, by said processor, a match between an input from said dialog and a pattern of data; altering the sequence of execution within the root behavior tree or the at least one further behavior tree upon detection of said match; and responsive to said altered sequence of execution, providing an output to cause a component of the contact center to perform one of said actions.

In comparison to conventional methods of managing a dialog, such as using finite state machine models, this method is better adapted to dynamically change the dialog in response to detected patterns of data from the dialog, such as when a context switch is detected, indicating that a new intent must be catered for. Whereas conventional techniques require that the script would have encoded within it transitions for each such context switch, the behavior tree model employed in this method enables execution to be smoothly passed to another part of the behavior tree or to the at least one further behavior tree in a more seamless and adaptive manner.

In an embodiment, said pattern of data is associated with an intent indicative of an alteration in the sequence of execution required within the root behavior tree of the at least one further behavior tree.

In an embodiment, said pattern of data is a pre-defined pattern of data stored in a memory accessible by said processor.

In an embodiment, said pattern of data is dynamically generated during execution of the method.

In an embodiment, said pattern of data is modified according to learned behavior following one or more iterations of execution of the root behavior tree or the at least one further behavior tree.

In an embodiment, said dialog is performed over a communication channel between the user and an automated conversation bot of the contact center, and wherein said output is effective to cause said communication channel to be redirected to a communication device used by a human agent of the contact center, to thereby place the user in conversation with said human agent.

In an embodiment, said dialog in step is performed over a communication channel between the user and a communication device used by a human agent of the contact center, and wherein said output is effective to cause said communication channel to be redirected to a different communication device used by a different human agent of the contact center to thereby place the user in conversation with said different human agent.

In an embodiment, said detected match is with a pattern of data indicative that escalation from one human agent to another is required.

In an embodiment, said different human agent is a supervisor.

In an embodiment, said at least one first-level behavior tree is defined to catch an exception, and to cause execution to return to said root behavior tree in response to catching an exception.

In an embodiment, the method further comprises storing a plurality of further behavior trees, and wherein at least one of which is a child node of a first-level behavior tree.

In an embodiment, another one of said plurality of further behavior trees is a child node of said at least one further behavior tree.

In an embodiment, the method further comprises: storing a current context state which determines the sequence of execution of a behavior tree being executed; and detecting, by said processor, a match between an input from said dialog and a pre-defined pattern of data associated with a context switch.

In an embodiment, responsive to detection of a match associated with a context switch, said context switch is stored as an intent for future execution.

In an embodiment, responsive to detection of a match associated with a context switch, execution is transferred from the behavior tree being executed to a different behavior tree.

In an embodiment, the method is recursive and comprises a plurality of nested context switches.

In an embodiment, the pre-defined pattern of data comprises a plurality of nested context switches.

In an embodiment, at least one child node of a behavior tree selected from one of said root behavior tree, a first-level behavior tree and a further behavior tree, is an output causing a message to be provided at a contact center device operated by said agent.

In an embodiment, at least one child node of a behavior tree selected from one of said root behavior tree, a first-level behavior tree and a further behavior tree, is an output causing a message to be sent to said user.

In an embodiment, at least one child node of a behavior tree selected from one of said root behavior tree, a first-level behavior tree and a further behavior tree, is an output causing a request to be sent to an automated system associated with said contact center.

In an embodiment, in response to said request, a response is received from said automated system and said response is an input used in determining the execution of the current behavior tree.

In an embodiment, at least one child node of a behavior tree selected from one of said root behavior tree, a first-level behavior tree and a further behavior tree, defines an action causing communication with the user to be transferred from an automated dialog to a live dialog with an agent of the contact center system.

In an embodiment, at least one child node of a behavior tree selected from one of said root behavior tree, a first-level behavior tree and a further behavior tree, defines an action causing communication with the user to be terminated.

In an embodiment, at least one child node of a behavior tree selected from one of a first-level behavior tree and a further behavior tree defines an action causing execution to be transferred to the root behavior tree.

In an embodiment, the method further comprises the step of generating a learned behavior tree from data acquired from previous dialogs, said learned behavior tree optimizing a goal of the contact center.

In an embodiment, the method further comprises deploying said learned behavior tree as a child node of an existing stored behavior tree.

In an embodiment, at least one node of one behavior tree is defined as a memory node having an execution flag and being associated with a memory, whereby upon execution of said memory node, data is stored in said memory and said execution flag is marked causing execution of the memory node to be skipped on subsequent iterations of the behavior tree of which it forms part.

There is also provided a system for managing a dialog between a contact center system and a user thereof, the system comprising: a processor; and a memory, wherein the memory stores instructions that, when executed by the processor, cause the processor to: store a root behavior tree comprising at least one flow control node and a plurality of child nodes, said at least one flow control node determining a sequence of execution of said child nodes; store at least one first-level behavior tree which may be executed to accomplish a task having an associated intent, wherein said at least one first-level behavior tree is a child node of the root behavior tree and wherein said at least one first-level behavior tree includes nodes which define actions to be performed by a component of the contact center system; host a dialog between said contact center and said user thereof, wherein the dialog is performed over a communication channel between the user and a component of the contact center; receive inputs from said dialog; execute the root behavior tree and said at least one first-level behavior tree as a child node of the root behavior tree in response to said inputs; detect a match between an input from said dialog and a pattern of data; alter the sequence of execution within the root behavior tree or the at least one further behavior tree upon detection of said match; and responsive to said altered sequence of execution, provide an output to cause a component of the contact center to perform one of said actions.

In another embodiment, there is provided a computer-implemented method of supporting an agent of a contact center system engaged in a dialog with a user, comprising the steps of: receiving, by a processor, inputs from a dialog performed over a communication channel between said agent and said user; storing a knowledge base comprising a plurality of entries wherein a subset of said entries are defined as higher priority entries; detecting, by said processor, a match between an input from said dialog and a plurality of said knowledge base entries; retrieving at least one of said plurality of entries corresponding to said match; pushing said at least one of said plurality of entries as an output to one or more of a device operated by said user and a device operated by said agent; detecting, by said processor, a further match between an input from said dialog and a higher priority entry in said knowledge base; and pushing said higher priority entry to a device operated by said agent while the dialog is ongoing.

In an embodiment, said higher priority entry comprises one or more prompts to said agent device directed to achieving a defined goal.

In an embodiment, said at least one device is a device used by said agent, wherein said one or more prompts coach the agent to achieve a defined goal.

In an embodiment, the method further comprises said processor continuing to receive inputs from said dialog and pushing updated prompts to said agent in response to further detected inputs, thereby coaching the agent through the dialog.

In an embodiment, a behavior tree is defined to implement the detection of matches, said behavior tree executing throughout the duration of the dialog and receiving inputs from said dialog, whereby a match detected causes processing within the behavior tree to transfer from one node of the tree to another node of the tree.

There is further provided a system for supporting an agent of a contact center system engaged in a dialog with a user, the system comprising: a processor; and a memory, wherein the memory stores instructions that, when executed by the processor, cause the processor to: receive inputs from a dialog performed over a communication channel between said agent and said user; access a knowledge base comprising a plurality of entries wherein a subset of said entries are defined as higher priority entries; detect a match between an input from said dialog and a plurality of said knowledge base entries; retrieve at least one of said plurality of entries corresponding to said match; push said at least one of said plurality of entries as an output to one or more of a device operated by said user and a device operated by said agent; detect a further match between an input from said dialog and a higher priority entry in said knowledge base; and push said higher priority entry to a device operated by said agent while the dialog is ongoing.

In a further aspect, there is provided a computer-implemented method for managing a dialog between a contact center system and a user thereof, comprising the steps of: hosting a dialog over a communication channel between an automated dialog engine of said contact center and said user thereof, said dialog comprising messages sent between said automated dialog engine and said user in both directions; said automated dialog engine receiving input messages from said user, and determining response messages in response to said inputs; detecting from said messages of said dialog a trigger event matching a rule; in response to detection of said trigger event: providing said agent station with a summary of said dialog; and providing control of said automated dialog engine to said agent station.

In an embodiment, this method further comprises the step of pausing the provision of response messages by the automated dialog engine following detection of said trigger event.

In an embodiment, the summary comprises a transcript of the dialog. In another embodiment, the summary comprises information obtained from a plurality of data sources based on said dialog.

In an embodiment, the provision of response messages is paused until an appropriate response message is selected at said agent station.

In an embodiment, said agent station is provided with a plurality of possible response messages by said automated dialog engine, permitting the selection of an appropriate response message therefrom.

In an embodiment, said appropriate response message is selected by creation of the message by a user of said agent station.

In an embodiment, following the detection of said trigger event, the automated dialog engine continues to determine and send response messages autonomously unless a control command is received from said agent station to pause the provision of response messages.

In an embodiment, the trigger event is determined by a rule matching a condition selected from: determining a keyword in one or more input messages; determining a sentiment in one or more input messages; determining a change in speaking volume or pitch; determining that an input message cannot be properly interpreted; determining that a response message cannot be determined in response to an input message; determining that a confidence level associated with a potential response message is below a predetermined threshold; determining that one or more input messages relate to a topic for which agent intervention has been defined as mandatory; determining that one or more input messages relate to a topic for which agent intervention has been defined as preferable; and determining that agent intervention has been requested by said user of said contact center.

In an embodiment, the method further comprises the automated dialog engine altering the rules according to which response messages are generated, in response to observation of control inputs received from said agent station.

There is further provided a system for managing a dialog between a contact center system and a user thereof, the system comprising: a processor; and a memory, wherein the memory stores instructions that, when executed by the processor, cause the processor to: operate an automated dialog engine system which engages in a dialog hosted over a communication channel of said contact center with said user thereof, said dialog comprising messages sent between said automated dialog engine system and said user in both directions; accept input messages from said user, and determine response messages in response to said inputs; detect from said messages of said dialog a trigger event matching a rule; in response to detection of said trigger event: provide said agent station with a copy of messages of said dialog; and provide control of said automated dialog engine to said agent station.

DETAILED DESCRIPTION

Figure 1:
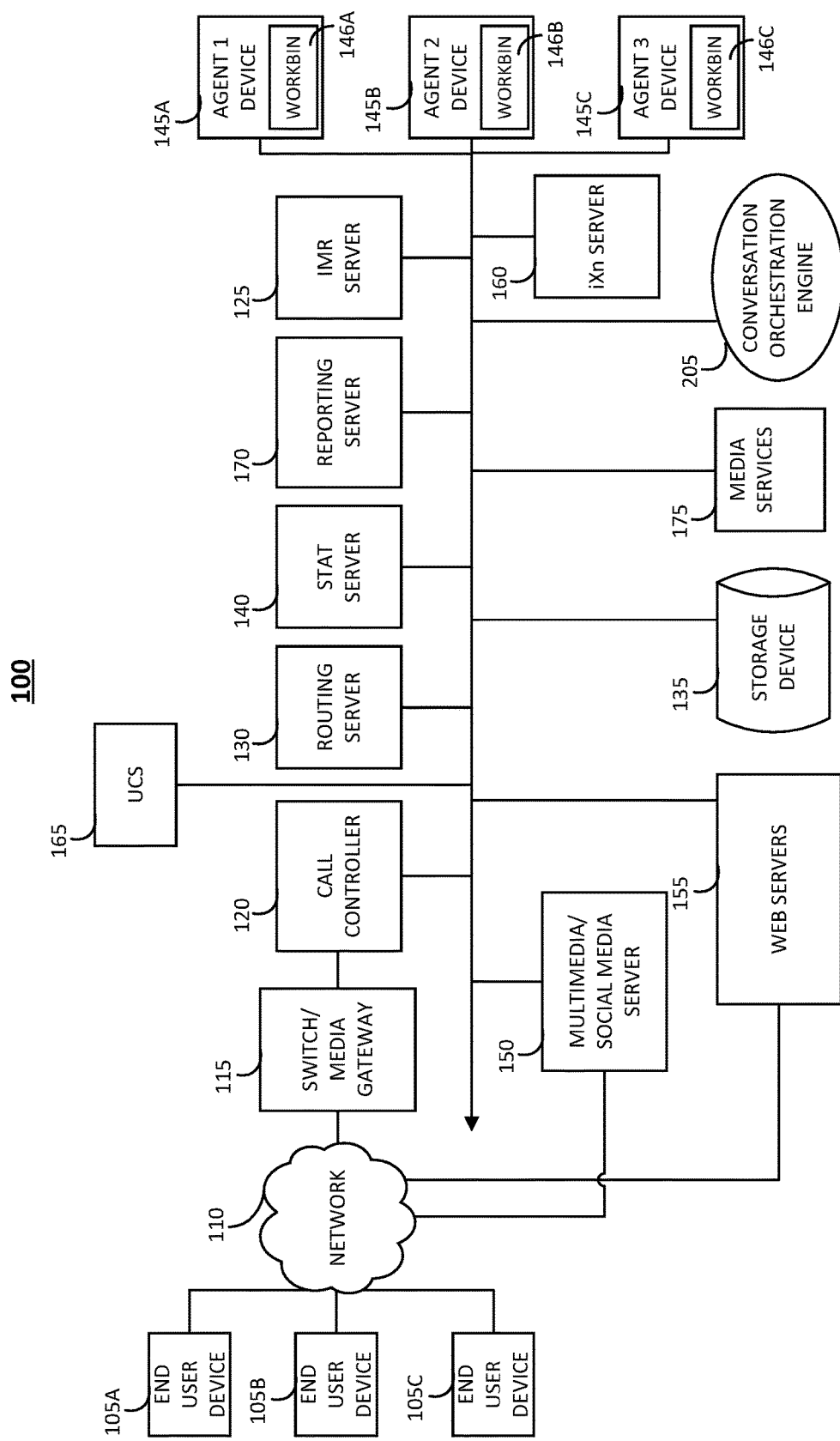
FIG. 1 is a diagram illustrating an embodiment of a contact center system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a contact center environment, a dialog might typically comprise a conversation between two or more parties (e.g., customers, agents and/or systems) to resolve a problem, serve a request, or otherwise accomplish some task/achieve some goal. The conversation may be performed through a variety of media channels, such as voice, chat, desktop, web, etc., to name a few non-limiting examples. An engine may be used (e.g., a dialog engine) to understand the state of the dialog at every turn. Turns might comprise an event from any party to the conversation or interaction, such as a response or a question. The dialog engine may be further used to control the next action taken through the system to move the conversation towards the contact center or business' goal. The dialog engine comprises 'conversational AI', which further comprises making context aware decisions throughout the interaction with a customer in a natural language, multi-modal medium. Actions may be directed to parties in a variety of ways. For example, an action may be directed to a customer through a message in the channel for the dialog. In another example, an action may be directed to an agent through recommending responses directly to the agent or indirectly as a coaching tip or other assistive guide on the agent's desktop. In another example, an action may be directed to a system in the form of an information request or the execution of a reservation.

Conversational AI (or Conversational Artificial Intelligence) presents several challenges to contact centers and enterprises, including uncertainty, multi-modality, conversation, and complexity. The Natural Language Understanding (NLU) used within the Conversational AI is error prone, making systems employing Conversational AI uncertain. For example, a party can take the initiative in the dialog (it is not just directed dialog) making it difficult to manage context in the conversation. Conversational AI is a multi-modal experience and not just a simple chat-bot. Interactions need to be orchestrated between a plurality of parties, including customers, agents, and a system, to name a few non-limiting examples. Additionally, there are many conversational channels (voice, digital, etc.) to be considered and back end systems that need to be integrated with, such as: transactional APIs, knowledge bases, enterprise information stores, etc. Further, the interaction needs to be conversational and natural sounding. This often means conveying the brand's voice and adapting to contexts (the customer's and/or the agent's) of parties (the customer's and/or the agent's). From a complexity standpoint, Conversational AI typically comprises several multi-step processes and domain knowledge integrations that orchestrate the journey of the customer and the resources (agents and systems) that make the orchestration and the journey happen.

To handle the modular, hierarchical, and hierarchical-scalable behaviors in the dialogs, behavior trees may be used. Building blocks of dialog are constructed and assembled together in manner so that they can be re-used and also in a manner with the interaction orchestrated. In an embodiment, the orchestration is reactive, allowing for out of turn execution and goal-directed execution (such as pursuing a task, for example). Behavior trees are also amenable to machine learning and automated planning/optimization. 'Slot filling', multi-turn context management, and integration with back end systems may be achieved. Slot filling may be demonstrated through the handling of out of turn information, over-informing, and prompting for missing information before taking action if needed. Multi-turn context management is demonstrated through intents being persisted across turns, slots persisting across turns, and context-aware slot switching. Back end systems are integrated through plugins for custom actions and API calls and using functions to transform data (e.g., turn a date into a month) for more elegant rendering. Behavior trees and their use within the dialog engine are described in greater detail below.

Contact Center System

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an interactive media response (IMR) server 125; a routing server 130; a storage device 135; a stat server 140; a plurality of agent devices 145A, 145B, 145C comprising workbins 146A, 146B, 146C; a multimedia/social media server 150; web servers 155; an interaction (iXn) server 160; a universal contact server (UCS) 165; a reporting server 170; media services 175, which may comprise a media manager and media instances; and a conversation orchestration engine 205.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication. In this regard, each agent device 145 may include a telephone adapted for regular telephone calls, VoIP calls, etc. The agent device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the conversation orchestration engine 205 mediates the dialogs between end users 105A, 105B, 105C and agents 145A, 145B, 145C using AI bots and dialog services to appropriately direct the dialog and react to inputs as will be described further below. In another embodiment, the conversation orchestration engine 205 may also mediate dialog between end users and bots in a self-service dialog interaction (i.e. the end user is conversing with the bot without an agent being associated with the interaction).

As noted above, the contact center may operate as a hybrid system in which some or all components are hosted remotely, such as in a cloud-based environment.

Conversation Orchestration Engine

Figure 2:
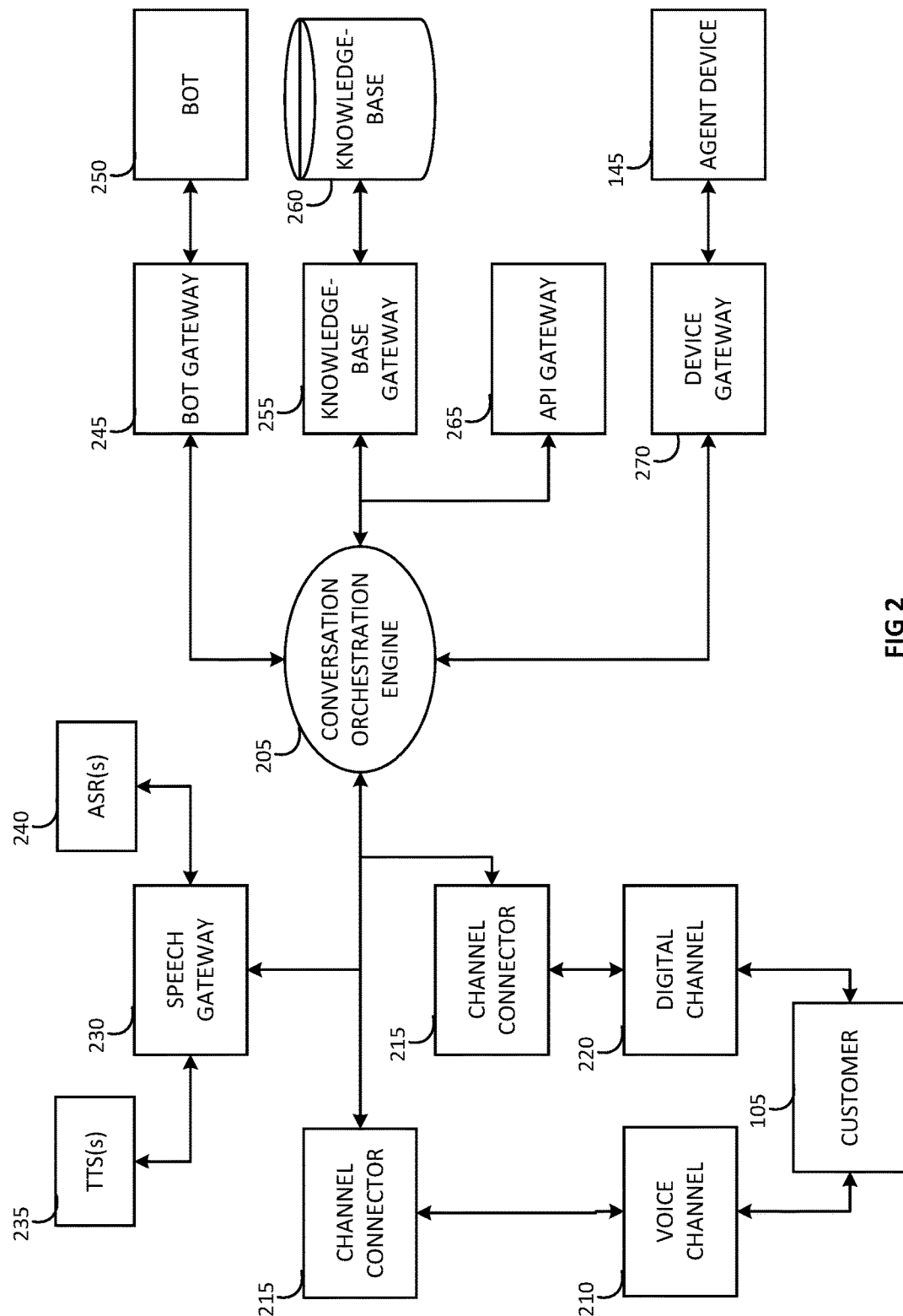
FIG. 2 is a diagram illustrating an embodiment of the logical architecture for a conversation orchestration engine.

FIG. 2 is a diagram illustrating an embodiment of the logical architecture for a conversation orchestration engine system, indicated generally at 200. In an embodiment, the system 200 may be employed in a contact center system 100 (FIG. 1). Components of the conversation orchestration engine system 200 comprise: a Conversation Orchestration Engine 205, a voice channel 210, voice channel connector 215, digital channel 220, digital channel connector 225, speech gateway 230, real time transcription (TTS) service(s) 235, speech to text (ASR) service(s) 240, bot gateway 245, bot 250, knowledge base gateway 255, knowledge base 260, API gateway 265, device gateway 270 and an agent device 145.

A customer 105 may communicate with the contact center system 100 in which the conversation orchestration engine system 200 is implemented using communication channels such as the voice channel 210 and the digital (or video) channel 220. Other channels, such as text channels, web chat channels and multimedia channels may similarly be supported and enable communication with parties external to the contact center.

Channel Connectors 215 handle inbound and outbound information flow between the conversation orchestration engine 205 and the channels 210, 220. Channel Connectors 215 may be platform specific or common across multiple platforms (e.g., Hub for Apple Business Chat, Facebook).

The speech gateway 230 provides access to the TTS service(s) 235 and the ASR service(s) 240, so that speech data may be converted to text and vice versa. Other components of the contact center which employ text-based inputs and outputs may therefore use audio data containing speech as an input or may have their outputs converted to a recognizable speech audio signal. In an embodiment, TTS service(s) 235 for voice channels may be third party. In an embodiment, ASR service(s) 235 for voice channel may also be third party.

The Bot Gateway 245 provides a connection for one or more bots 250, allowing them to interact with the orchestration engine 205.

Bot 250 may be third party (e.g., "Bring Your Own Bot") or organic (i.e. built into a dialog engine used in the contact center). Bot knowledge (vocabulary and action set) comprises a domain. The elements of a domain further comprise entities, slots, intent, utterances, behavioral trees, context, and channel specific implementation. The details of these are further described below.

Knowledge Base 260 provides content in response to queries. The knowledge base may be a third-party knowledge base or be an organic solution. An intermediary service (the Knowledge Base Gateway 255) is used to allow for dialog context-based search to be federated over knowledge sources that are registered in a gateway.

The Conversation Orchestration Engine 205 acts as a conduit which orchestrates actions throughout the contact center in response to conversation flows. The Conversation Orchestration Engine 205 comprises platform specific services and common services which may also incorporate a dialog engine as part of a native conversation AI capability. The Conversation Orchestration Engine may also use third party systems providing voice- and text-based conversation interfaces like Google's Dialogflow or Amazon Lex. It acts as a conduit orchestrating all event flow. The Conversation Orchestration Engine 255 is structured dependent on platform and target deployment model (cloud, premises, hybrid). Having this engine provides for the ability to maintain universal context and arbitrate action at almost any level.

The agent device 145 (FIG. 1) comprises an interface which permits a contact center agent to participate in an interaction or conversation with a customer 105, as well as permitting interaction with other agents, supervisors, and automated entities of the contact center such as the bot 250. An intermediary service (the Device Gateway 270) handles pushing of information to the Agent's device 145 and serves queries from the device to the conversation orchestration engine 205.

The API Gateway 265 enables the conversation orchestration engine 205 to interact with a wide range of other systems and services via application program interfaces, including internal and external systems and services.

Figure 3:
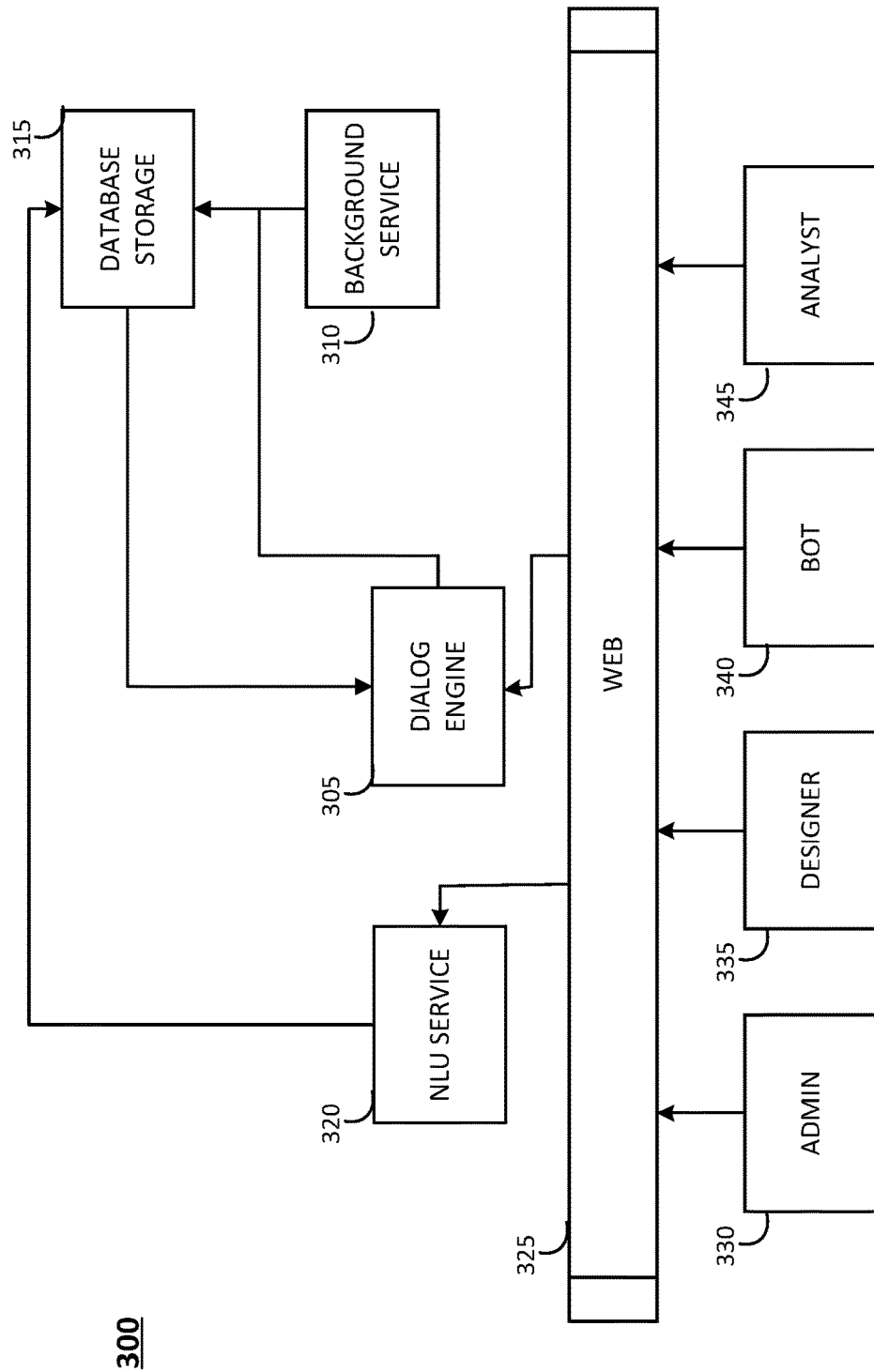
FIG. 3 is a diagram illustrating an embodiment of a system architecture for a dialog engine.

FIG. 3 is a diagram illustrating an embodiment of a system architecture for a dialog engine, indicated generally at 300. In an embodiment, the system 300 may be used in a hybrid micro-service architecture. Components of the dialog engine system 300 comprise: a dialog engine 305, a background database service 310, a storage database 315, a natural language understanding (NLU) service 320, internet (or web) 325, an admin program 330, a designer program 335, a bot 340, and an analyst program 345. The admin program 330 enables an administrator to control user management within the dialog engine 305 through a UserAPI via the web 325. The designer program 335 enables a system designer to create Bot applications and bot models through APIs connected to the web 325. The NLU service 320 may be an artificial intelligence service which is capable of receiving and interpreting naturally spoken speech data according to a trained language model. The NLU model is trained and then uploaded with the Bot model to a storage database 315. The Bot 340 inputs dialog through an API. There may be an arbitrary number of bot instances, such as, for example, one bot per dialog session with a user. The dialog engine 305 downloads the bot model from the storage database 315 and can then process a dialog behavior tree as described in greater detail below. The processing session is uploaded to the storage database 315. The web 325 comprises a background service 310 which trains the models. The trained modes are provided to the storage database 315 for use by the dialog engine 305. The analyst program 345 requests reports for bot performance and tuning. The dialog engine system 300 is implemented as a component within the conversation orchestration engine 205 (FIG. 2).

Figure 4:
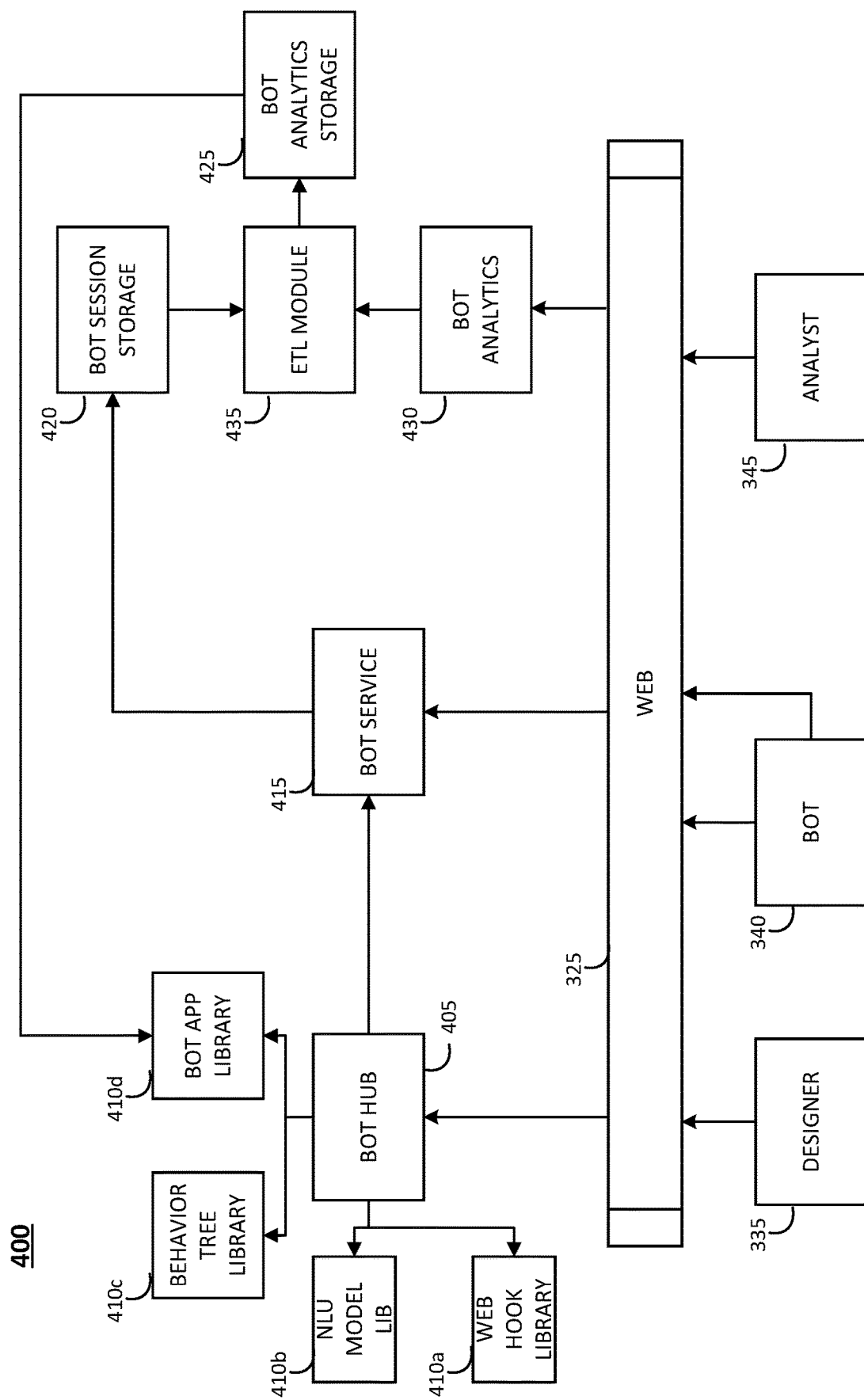
FIG. 4 is a diagram illustrating an embodiment of a system architecture for a dialog engine.

FIG. 4 is a diagram illustrating an embodiment of a system architecture for a dialog engine, indicated generally at 400. In an embodiment, the system 400 may be used in a cloud native micro-service architecture. Components of the dialog engine 400 comprise: a designer program 335, a bot 340, an analyst program 345, the web 325, a bot hub 405 that links to a plurality of libraries 410a-d, a bot service 415, a bot session storage 420, a bot analytics storage 425, a bot analytics module 430, and an extract, transform and load (ETL) module 435.

The splitting of the dialog engine 305 into three services within the system 400 (e.g., the bot hub 405, bot service 415, and bot analytics module 430) vertically, allows each service to be deployed, upgraded, and scaled individually to meet its own requirements. For example, the bot service 415 might require fast access to its session storage. Memcached, which is a general-purpose distributed memory caching system, could be placed on top of database storage in order to speed up data access by caching data and objects in RAM to reduce the number of times the database storage must be read. In addition, bot service 415 often requires rapid scalability (up and down) in response to a load in real-time. Conversely, bot analytics 430 may not require real-time processing and could be run in a batched manner. Bot hub 405 requires being highly secure, transaction and well version controlled. It may also require access globally. The bot hub 405 serves as the frontend and the back end for bot modeling. Users are able to pull, save, and publish all bot design artifacts and reuse them across projects from the libraries 410a-d. During deployment, the bot service 415 may also pull domain files and trained NLU models from the bot hub 405. The libraries 410a-d comprise a web hook library 410a, a natural language understanding (NLU) model library 410b, a behavior tree library 410c, and a bot library 410d.

The bot service 415 provides live bot services in real-time. The bot service 415 is capable of integration with omni-channel multimedia, such as voice, messenger services (e.g., Facebook Messenger, Slack, Skype), social media (Twitter). Real-time monitoring is also provided, allowing agents to "barge-in".

The bot analytics module 430 provides bot analytics that give insights into the operation of the contact center by mining past chat transcripts from the bot session storage 420 using the ETL Module 435. Feedbacks from the bot analytics module 430, such as fail to be interpreted user utterances, unexpected user intents, bad business practices, bad actions, bad webhook requests, etc., can be used to further improve bot modeling and stored 425 for use by other components, such as the bot app library 410d. The bots implement a behavior tree form of operation to control, direct or manage conversations taking place with customers of the contact center.

Generally, as previously mentioned, bot knowledge (e.g., vocabulary and action set) comprises a domain. The elements of a domain further comprise entities, slots, intent, utterances, behavioral trees, context, and channel specific implementation.

An entity may be another name for a data type. Entities may be built in, like strings and dates. They may be defined as: "Plugin Name: de.entities.BuiltIn". This string declares an entity called 'Name' is implemented by a particular plugin class. Entities may be pre-registered to be made accessible. Paths may also be specified for custom entities.

A slot comprises an instance of an entity. Slots may have a name, an entity, and may have prompts to use when slot filling. A prompt is an example of an utterance generated by the engine and may be defined with templates.

An intent is a semantic label assigned to an utterance. For example:
intent ask_temperature:
display_name: 'weather service'
phrases:
  what is the temperature [City:city] (paris)?
  weather in [City:city](prague) in [DateTime:date] (May)
  weather in [City:city] (dublin)?
  weather in [DateTime:date] (May)
  weather in [City:city] (galway)
  temp in [DateTime:date] (galway)?

Intent may also include a display_name which can be used for confirmation behaviors. Intents also comprise labels for natural language text.

An utterance, or prompt, comprises a message generated by a bot. An utterance may be defined using templates with parameters which are filled from context, or passed in explicitly when the utterance is selected. An utterance may include alternative templates, allowing for variation in a dialog. Not all templates may have the same parameters. Variations may also be preferred, depending on the amount of information in the context. For example "I made a booking for you. Booking details sent to { {email} }", and "You are good to go { {name} }. Booking details sent to { {email} }".

Behavior Trees

Generally, a behavior tree comprises a singly rooted directed tree where leaf nodes are either conditions or actions, and intermediate nodes control execution semantics over their children. The execution of a behavior tree starts from the root which sends ticks with a certain frequency to its child. A tick is an enabling signal that allows the execution or evaluation of a child. When a condition node is evaluated, it returns SUCCESS, or FAILURE. When an action node is evaluated it returns SUCCESS, or FAILURE or RUNNING. The combination of re-evaluation on every turn and the use of a RUNNING state allows for nodes to have the semantics of running over more than one turn. This has been very helpful when composing self-contained behaviors. A tree is evaluated from the root in a pre-order traversal, left to right, top to bottom. Behavior trees have been found, on dialogs of varying complexity, to be highly expressive, simple, modular, hierarchically composable, and amenable to automated synthesis.

Behavior trees comprise conditions, actions, sequences, nodes (e.g., fallback, parallel, branch, decorator, memory, action, etc.), context. A condition is a Boolean function with short cut syntax to specify an intent as a condition. A condition expressed as an intent (e.g. condition: buy_car) is logically equivalent to the implied semantics of: top_intent( )==buy_car and prob(buy_car)>=THRESHOLD. Intents are probabilistic in principle, but are used in the embodiments described herein as Booleans. This can drive confirmation behavior if required. The notion of a condition may be generalized to include any expression or function that returns SUCCESS or FAILURE. Expression syntax is currently limited to intents, and functions. Condition functions can be declared as plugins. For example, plugin greater_than: de.conditions.plugin And used as:

condition: greater_than (age, 18)

An utterance, or prompt, comprises a special case of an action. In an embodiment, actions are plugins that are callable by the dialog. Actions may be registered as:

Plugin weather lookup: travel_bot.weather_lookup

Plugin calc_month: travel_bot.calculate_month

Actions follow the pattern for entity plugins with a name: implementation_class. In an embodiment, pre-registered actions may be provided. Actions in a domain can be defined with parameters.

Within a behavior tree, sequences comprise statements assembled together as instructions that run one after the other. A variety of flow control nodes may also be applied within behavior trees. Different types of nodes might comprise: selector nodes, fallback nodes, sequence nodes, parallel nodes, branch nodes, memory nodes, decorator nodes, etc., to name a few non-limiting examples.

A selector node may often be used to define a priority of execution over possible child nodes and lends the modular and composable properties to behavior trees.

Fallback nodes are used to find and execute (or tick) the first child that does not fail such that the fallback node stops "ticking" subsequent child nodes on the first child node in order that returns SUCCESS (fallback node) and the first child node that returns FAILURE (sequence node). A fallback node will return immediately with a status code of SUCCESS or RUNNING when one of its children returns SUCCESS or RUNNING. The children are ticked in order of importance, from left to right.

In pseudocode, the algorithm for a fallback composition may be represented as:

```
for i from 1 to n do
    childstatus ← Tick(child(i))
    if childstatus = running
        return running
    else if childstatus = success
        return success
end
return failure
```

Sequence nodes are used to find and execute the first child that has not yet succeeded. A sequence node will return immediately with a status code of FAILURE or RUNNING when one of its children returns FAILURE or RUNNING. The children are ticked in order, from left to right.

In pseudocode, the algorithm for a sequence composition is:

```
for i from 1 to n do
    childstatus ← Tick(child(i))
    if childstatus = running
        return running
    else if childstatus = failure
        return failure
end
return success
```

Parallel nodes are hybrids between a sequence and a fallback node. A parallel node will traverse the nodes left to right and M or N nodes must succeed for the node to succeed. In an embodiment, these might be used where multiple update modes are concurrently available on an agent desktop in a contact center when a bot is used to assist an agent. For example, flagging escalation to a supervisor, suggested inline responses to an agent, surfacing knowledge, tracking and publishing sentiment, etc.

Branch nodes implement the semantics of if-then-else. Branch nodes address the gap on behavior tree formalism where it is inconvenient to express:

```
if condition_clause
    then then_action
    else else_action
```

A branch node is similar to:

```
- fallback:
    - action condition_clause: then_action
    - action not(condition_clause): else_action
``` branch nodes might be shown as:

```
- branch:
    - if:
        - condition: condition_clause
    - then:
        - action: then_action
    - else:
        - action: else_action
```

Implementation is described as:

```
def tick(self, context, level):
    if_status, results = self[IF].tick(context, level)
    if if_status == RUNNING:
        return RUNNING, [ ]
    if if_status == SUCCESS:
        return self[THEN].tick(context, level)
    else:
        return self[ELSE].tick(context, level)
    return if_status, [ ]
```

All nodes are tri-valued.

A memory node may be used to avoid re-evaluation by allowing their last execution result to be cached and if the node succeeded, it will be skipped. In the the example representation below, memory nodes are annotated with *. This suppresses re-evaluation of completed children. As such, from turn to turn, a sticky execution results on a part of the sequence. For example:

```
- sequence:
    - condition: book_hotel
    - sequence*:
        - action: clear_slot (hotel_name, hotel_booked)
        - action: utter_ack_book_hotel
        - tree: bt_search_hotel
        - tree: bt_reserve_hotel
        - tree: bt_conclude_booking
```

The re-use of a cached result will generally be predicted on the values of the slots or variables that the node in question uses. This allows for skipping the node if none of the input data has changed, while allowing re-evaluation if the user explicitly changes the value of one of the slots. For example, a decorator pattern may be used. An action which is executed using variables x and y may require skipping execution if x and y have not changed. A memo( ) decorator could be used to wrap the action (or any node). For example:

action memo (x, y): do_action (x, y)

A decorator is evaluated as a guard on execution and its state can be cached in context for that exact node_id in context. For example, using a degenerate with no arguments means the decorated node will be run at most once, ever. This might be used with a greeting and can easily be extended to switch on and off sub-trees.

New node types can be easily created to extend a behavior tree-based paradigm. For example, a node for a machine learning based dialog which uses examples of dialog (e.g., question answer pairs) or more elaborate 'stories' to train a policy for a next best action. A fallback node might be used where the order of execution is determined by a machine learning algorithm based for choosing node orderings that maximize the chances of success while minimizing the number of turns, in a context dependent manner. Further, in an embodiment, something similar might be used for choosing among alternative concrete messages for any given utterance in such a way as to optimize some outcome, as long as the outcome can be captured. For example, any slot filling behaviors do well, when the slot is filled correctly with the minimum number of turns. This could yield lines of prompting that solicit best responses.

Figure 5:
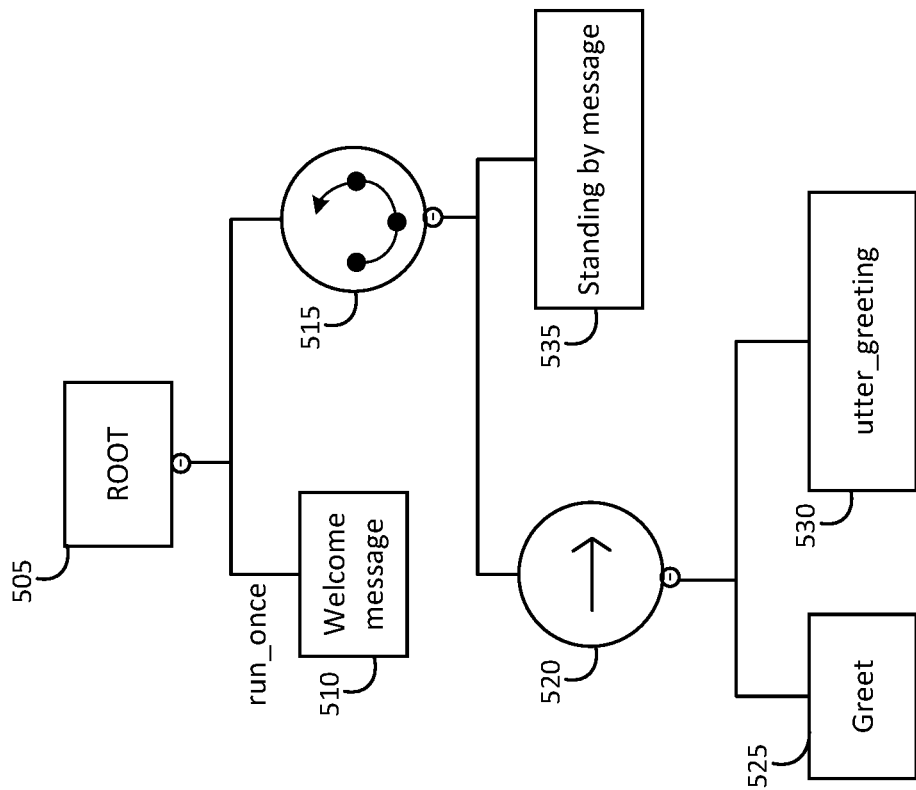
FIG. 5 is an example of a behavior tree structure used by a conversation orchestration engine.

FIG. 5 shows an example of a simple behavior tree 500 used in a contact center to manage a greeting dialog that is encountered when a customer is placed in communication with the contact center.

The behavior tree 500 comprises a root node 505, a 'Welcome message' utterance 510, a fallback node 515, a sequence node 520, a 'greet' condition node 525, an 'utter_greeting' utterance node 530, and a 'Standing by message' utterance node 535.

Execution of the behavior tree starts from the root node 505 which sends ticks to each of its children in turn, namely the 'Welcome message' utterance node 510 and the fallback node 515. In an embodiment, the 'Welcome message' utterance node is marked to be run once, so that the customer is played a welcome message on first connection. The welcome message may be a recorded message which is played by the IMR server 125 (FIG. 1) under the control of the orchestration engine 205 (FIG. 2) which is executing the behavior tree of FIG. 5 as a bot service. Thus, the exemplary behavior tree illustrated in FIG. 5 acts as a flowchart for the control of the dialog with the customer.

After the first execution of the 'Welcome message' utterance 510, on each cycle a tick is sent to the fallback node 515, which evaluates each of its children to find and execute the first child that does not fail. The children are ticked from left to right in turn, namely the sequence node 520 and the 'Standing by message' node 535.

When the sequence node 520 is ticked, it attempts to find and execute the first child that has not yet succeeded, namely the 'greet' condition node 525 and the 'utter_greeting' node 530. As noted previously, a sequence node will return immediately with a status code of FAILURE or RUNNING when one of its children returns FAILURE or RUNNING and the children are ticked in order, from left to right.

If an agent is free, or is about to become free, to handle the conversation with the customer, an automated greeting is to be played. Accordingly, the 'greet' condition node 525 checks the agent availability to determine whether or not to play the automated greeting. If no agent is available, then the greet condition node returns FAILURE, which causes the sequence node 520 in turn to return FAILURE to the fallback node 515.

As a result, the fallback node (which is executing to find the first child that does not fail) sends a tick to the 'Standing by message' utterance node 535, with the result that a standing by message is played to the customer. A timeout (not shown) will typically precede the playing of this message, so that a predetermined period passes between standby messages in circumstances where there is still no agent free. The 'Standing by message' utterance node returns RUNNING which causes the fallback node 515 to also return RUNNING to the root node.

The system continues to evaluate the fallback node for as long as the same conditions hold, namely that no agent is free. Once an agent is free, the evaluation of the 'greet' condition node 525 on the next tick changes from FAILURE to SUCCESS. Execution then passes to the 'utter_greeting' utterance node 530 which in turn returns success. Because both child nodes have returned SUCCESS the sequence node 520 similarly returns SUCCESS, and therefore the fallback node 515 will also return SUCCESS to the root node 505.

The root node 505 can terminate execution, or it may continue to send ticks to its children which continue to return the same status as long as nothing material has changed. In the example behavior tree of FIG. 5, no changes would be expected, as the 'Welcome message' node 510 retains its flag of having already been run once, and the 'greet' condition node 525 and 'utter_greeting' utterance node 530 retain their SUCCESS status, which means in turn that on each tick the sequence node 520 and fallback node 515 continue to return SUCCESS indefinitely.

Figure 6:
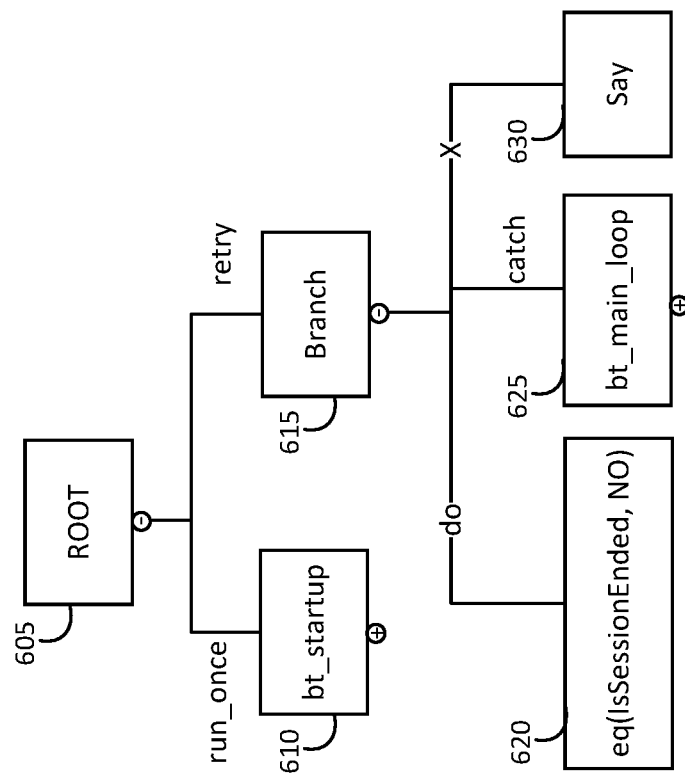
FIG. 6 is an example of a behavior tree structure used by a conversation orchestration engine.

FIG. 6 is an example of a behavior tree 600 with more functionality added relative to the example illustrated in FIG. 5, providing the basis for a complete dialog management system for a contact center. In an embodiment, the root node 605 has two children, namely a startup node 610 and a branch node 615.

The startup node 610 is itself a behavior tree containing its own children and defining a desired functionality at the start of an interaction. The children are not shown but may be revealed to a user of the interface from which FIG. 6 is captured by expanding a "+" symbol at the bottom edge of the node's icon. The functionality of the behavior tree defined under this startup node 610 may, for example be the same as the FIG. 5 root node.

In an embodiment, the branch node 615 has three children: a condition check 620, a main loop behavior tree 625 and an utterance 630. A tick is sent on each iteration of the branch node to the condition check 620, which performs a check on a session status value 'IsSessionEnded', and returns SUCCESS if the session is still ongoing, and FAIL-URE if the session has ended. As long as the return value is SUCCESS, the branch node 615 will send a tick to the main loop behavior tree 625. When a FAILURE value is returned from condition check 620 the branch node 615 will pass execution to the utterance 630 which will typically be a "goodbye" message.

The main loop behavior tree 625 may have any programmed functionality below it, some examples of which are described below. It will have its own children, at least some of which are typically going to be complete behavior trees in their own right. For example, in a pizza ordering contact center, there may be a tree that handles obtaining or verifying customer details, delivery address etc., a tree that handles ordering of an individual pizza, a tree that handles building a complete order of individual pizzas, and a tree that handles payment.

Figure 7:
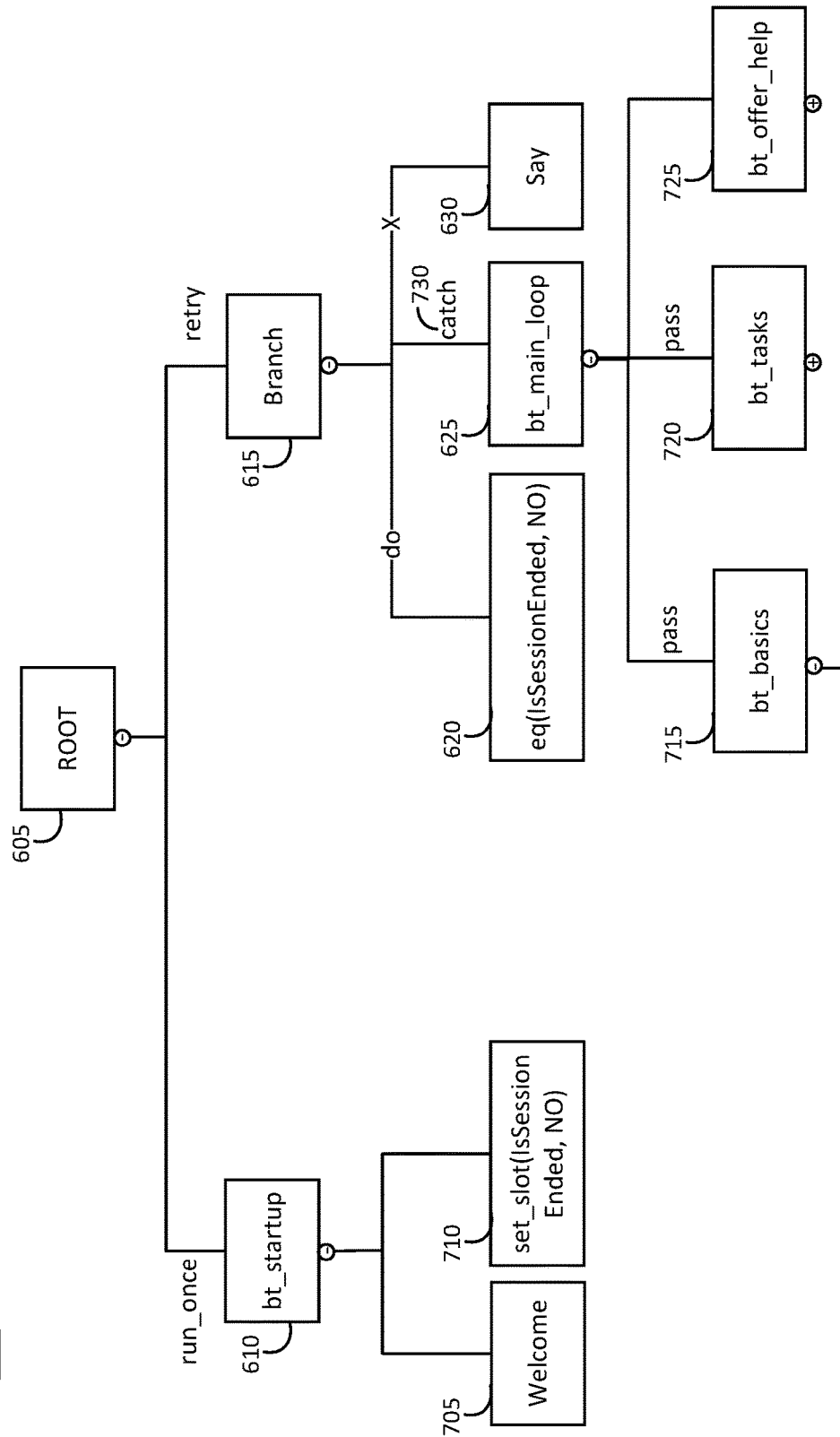
FIG. 7 is an example of a behavior tree structure used by a conversation orchestration engine.

FIG. 7 illustrates an embodiment of a behavior tree 700 which is identical to the behavior tree 600 of FIG. 6 but with the startup behavior tree 610 and the main loop behavior tree 625 both expanded to illustrate the next level children.

The startup behavior tree 610 in this embodiment provides a simpler functionality than that of FIG. 5, and plays a welcome message 705, before setting the value of the flag 'IsSessionEnded' to NO in an action node 710. The startup node is marked to run once only. Further changes to the flag can be set on other parts of the overall behavior tree 700, such as when it is detected that an order is completed, or a query answered, and that the customer has no further requirements or questions.

The children of the main loop behavior tree 625 are three nodes—'bt_basics' 715, 'bt_tasks' 720 and 'bt_offer_help' 725—which themselves are behavior trees with their own functionality and their own children, not shown in FIG. 7.

The 'bt_basics' tree 715 can perform initial services required to service a customer, such as verifying customer identity, determining the nature of the query, performing interactive media response sessions, determining required agent skillsets, and agent assignment.

The main loop behavior tree node operates as a sequence node that returns RUNNING when any of its children (polled in turn from left to right) returns RUNNING. Thus, it passes execution to the 'bt_basics' tree which maintains a RUNNING status until the execution is determined to have been complete, at which point the 'bt_basics' tree no longer returns RUNNING. On the next tick therefore, the control is passed to the 'bt_tasks' tree 720.

The 'bt_tasks' tree 720 may define the detailed dialog management for the agent or for a bot to perform a number of potential tasks or scenarios, with the appropriate task being determined by the detected intent of the customer, either through the initial call handling in the 'bt_basics' tree 715 or by recognizing from the further conversation that additional or alternative intents exist that need to be handled.

The 'bt_offer_help' tree 725 is invoked when the conversation encounters difficulties that cause a failure of the tasks within the 'bt_tasks' tree. So for example if the customer demands to speak to a supervisor or a human agent, or if the customer's responses cannot be understood, or if an intent is detected for which there is no defined dialog within the 'bt_tasks' tree 720, then the 'bt_tasks' tree may return FAILURE and execution passes to the 'bt_offer_help' tree which may use human or automated means to resolve the detected difficulty.

A catch decorator 730 is provided on the main loop behavior tree which detects that an exception has been thrown within any of the child trees for which no well-behaved exception exists, and which can for instance cause the interaction to be restarted or to be returned to any given point within its child nodes according to already-established values, intents and conversation history.

Context may be used within a behavior tree for: state of the behavior tree execution (where nodes have memory); active slots and intents; candidate slots and intent; sticky intents; augmentation of NLU by restricting expected slots, values and intents; sub-intents; follow-on intents; state passed into nodes; etc. Context might practically comprise the set of slots and intents active for a dialog at any given time. Knowledge and memory for the information already obtained is important for natural language statements. For example, System: . . . The Grand Hotel is 99 Euro per night, and has 3 stars Customer: Does it have a pool?

System: . . . Yes, the Grand Hotel has a 25 m lap lane swimming pool.

The context that the current hotel is the "Grand Hotel" allows a subsequent question where the reference is implied by 'it' to be understood. Consider the following examples of intents and recognition phrases:

intent ask_hotel_info:
   does [Hotel:hotel_name] (it) have a [HotelAttrhotel_attr] (pool)
   does [Hotel:hotel_name] (that) have a [HotelAttrhotel_attr](pool)
   does the [Hotel:hotel_name] (hilton) have a [HotelAttrhotel_attr](pool)

This intent declaration allows pattern recognition to focus on very particular patterns that may yield values that can then be interpreted in a context dependent way to resolve the co-reference resolution. Memory slots may also provide another example of context across turns. In the below example, the city is known. The date of the inquiry has changed. The system though, has retained the context that this is a weather inquiry.

Customer: . . . What is the temperature in Paris in September

System: . . . The average temperature in Paris in September is 22 degrees

Customer: . . . How about October

System: . . . The average temperature in Paris in October is 17 degrees

Slot values must be retained across turns when set and some intents must be retained across turns, while others do not.

Figure 8:
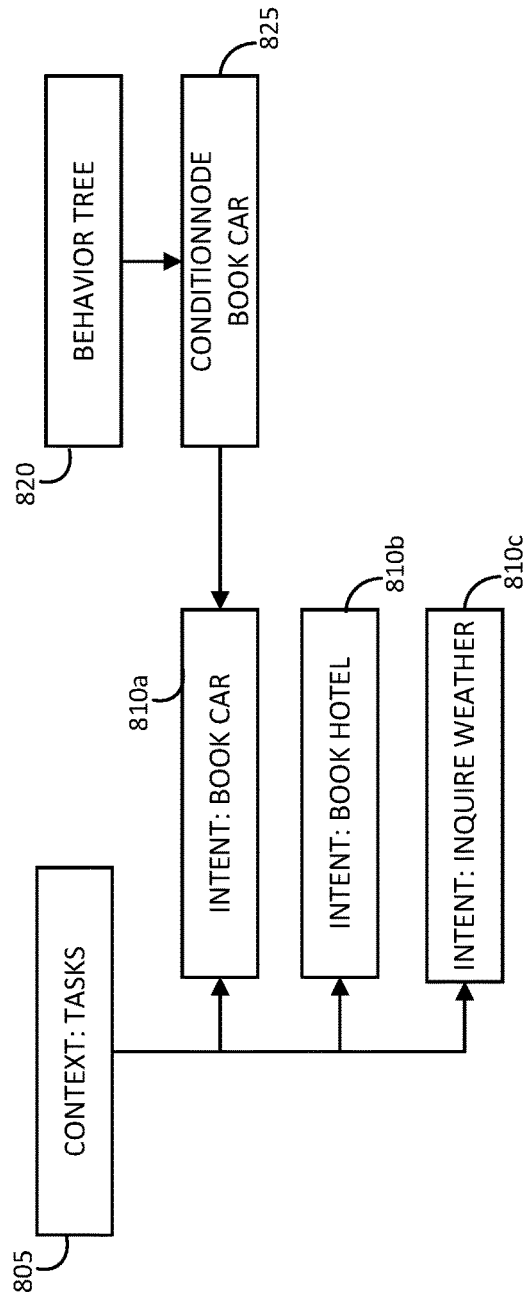
FIG. 8 is a diagram illustrating an embodiment of the relationship between intents, context, and a behavior tree.

A context may be defined. For example:
context tasks:
intents:
  ask_temperature
  book_hotel
  book_car The context name is called 'tasks' in the above example. It references a set of mutually exclusive intents. FIG. 8, for example, is a diagram illustrating an embodiment of the relationship between intents, context, and a behavior tree, indicated generally at 800. FIG. 5 depicts intents related to a named context 805 and demonstration of how this is linked into a behavior tree 820 via a condition node 825 with an intent. When NLU detects an intent 810a-c (e.g., book car 810a, book hotel 810b, inquire weather 810c, to name a few non-limiting examples) on the tasks context, the dialog engine will set context[task]='Book Car', if no value is present already. The assignment is thus retained across turns since it has been automatically stored. In a subsequent turn, for example, if the customer informs a city location or asks for prices, the intent is retained for context[tasks]. This is used in a behavior tree 820 by simply specifying a condition 825 on the intent. For example, condition: book_car.

The dialog engine also tracks active contexts. There is a plugin (is_active) which takes a list of contexts and returns True if all contexts are active, otherwise, False. If an intent is already assigned to a context, and a new intent is detected from the same context, then it is tracked as a context_switch, which can be recognized and arbitrated through dialog by asking the user to clarify how they wish to handle the switch, or simply writing a policy in the behavior tree. A context_switch is provided as a condition that accepts positional arguments. For example, context_switch( ): #True if any context switch found
context_switch(c1): #True if any context switch for context c1
context_switch (c1, i1): #True if any context switch on c1 from i1

By default, all context_switches for a turn are cleared on the next event, with no impact to system state. However, behaviors are provided to handle context switches, and the dialog engine provides a stack representation for an intent_backlog. A condition can be used to check if there is a backlog intent: has_backlog.

The key actions for handling context switches might include: push_intent (intent); intent-pop_intent( ) subsume_intent (intent_1, intent_2); set_intent(intent); clear_intent(intent); and ctx, from, to=pop_context_switch( ) The 'push_intent(intent)' places intent on a stack for later. The 'intent-pop_intent( ) pops intent of a stack, if available. This will fail if no intents on the stack. The subsume_intent (intent_1, intent_2)' pushes intent_1 on the stack and sets intent_2 to be the active intent. The 'set_intent (intent)' sets intent assignment for a context. Will remove it from backlog also. The 'clear_intent(intent)' clears intent assignment for a context. The 'ctx, from, to=pop_context_switch( )' action will pop the latest context switch from a stack (accumulated on a single turn), and return its parameters: the context, the intent that it switches from, and the intent that it would switch to. For example, when any context switch is detected, the system pops it, and executes the replacement of the current context. The new intent subsumes the existing on in this example:

sequence context_switch( ):
  action: context, from, to=pop_context_switch( )
  action: subsume_intent(from, to)

In another example, the system watches out for a particular context switch (from i1 to i2) and stores it for later execution. Finally, the system might detect that there is a backlog of intents from prior context switches that the model stored for later. The following example might be executed when a backlog is detected, and it will pop the intent off of the stack and set it:

sequence has_backlog:
  action: intent=pop_intent( )
  action: set_intent(intent)

Figure 9:
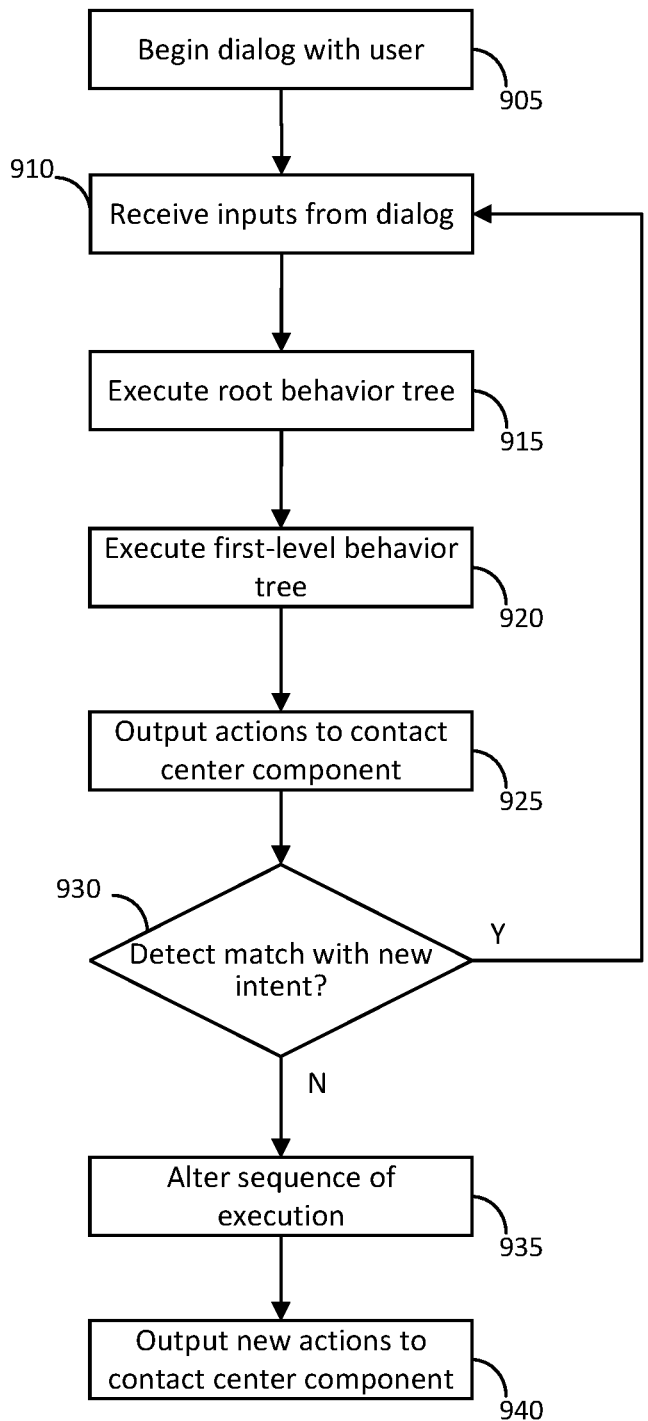
FIG. 9 is a flowchart of operation of a conversation orchestration engine.

FIG. 9, described further below, provides an embodiment illustrating additional detail on the handling of new intents and context switches. In an embodiment, behavior trees may be implemented in specific media channels. For example, ordering a pizza through a voice channel requires a multi-turn conversation to specify the pizza size, toppings, base, etc. Different paths and interactions may be taken depending on the channel needed to achieve the same goal. This might be done by breaking down the process of ordering a pizza into specifying the pizza and the payment of the pizza. If a media rich channel (like web chat) is being used, there is the possibility of pushing an 'applet' that allows the user to specify all the things needed to order the pizza in an interactive fashion before finally submitting the request.

Within the dialog engine, specific channels may be implemented, including chat, voice, agent desktop, and web. For example, in the chat channel, the implementation will be text-based). Voice is typically phone based, but could also originate from a browser or a device like Alexa. On an agent Desktop, usage is for prompting a human agent with potential content to send to the customer (e.g., an FAQ item, a conversational sub-dialog to perform customer identification and verification (ID&V) on the customer, etc.). The following examples may be applicable to both voice and chat.

In an embodiment, a simple use case for capturing intent, slots, and performing successful back end lookup could be:
    User: Hi, I'd like to check the balance for phone number 016360028 please. (Here, the system detects intent (balance_inquiry) and a slot (phone_number)
    System: Balance inquiry! What's the last 4 digits of the account number?
    User: 1234
    System: . . . Thanks. (The system calls the back end service to validate the phone and account number details. The intent is marked as 'done' at this point). Your current balance is $42.50 and is due on 29$^{th}$ August. Anything else I can help with?
    User: . . . No thanks.

In another embodiment, a user case for handling a failed back end lookup is illustrated. A system has to ask for some information again from the user, after a back end request reveals the information to be invalid, demonstrating the need for looping in the dialog definition.
    User: Hi, I want to check my balance. (Here, the system detects intent (balance_inquiry), so asks for remaining slots).
    System: Balance inquiry! What's the phone number?
    User: 016360028
    System: And the last 4 digits of the account number?
    User: 9999
    System: Thanks. (The system calls the back end service to validate the phone and account number details—in this case, the details are invalid. It could be that the system heard the details incorrectly and didn't confirm them, or that the user provided the wrong values in the first place). I'm sorry, those details don't match. Can you please provide them again? What's the phone number?
    User: 016360028 and the account number is 1234.
    System: Thanks. (The system calls the same back end service to validate the new phone and account number details.) Your current balance is $42.50 and is due on 29th August. Anything else I can help with?

The encoding might look as such in the behavior tree:

```
#Happy Path for ID&V
behavior_tree account_id_verification:
    action: asks(phone_number, account_number_digits)
    action: utter_thanks
    action: account_id=get_account_details(phone_number, account_number_digits)
    condition: neq(account_id, NONE): utter_thanks #SUCCESS
#Reset behavior on failure
behavior_tree resert_account:
    action: utter_no_account_found
    action: reset_slots(ccount_id, phone_number, account_number_digits)
```

```
#Full Behavior with retries and follow up if successful
behavior_tree balance_inquiry:
    condition: intent_balance_inquiry
    tree retry(max_tries=3, error_handler_reset_account):
        account_id_verification
    action: balance=lookup_balance(account_id)
    action_utter_balance (account_id, balance)
    action: utter_anything_else
```

In yet another embodiment, continuing on with the same session immediately preceding, the user expresses a new, related intent, the wording of which (why is it so high?") only makes sense in the context of the previous, completed intent (balance_inquiry):
    System: Your current balance is $42.50 and is due on 29$^{th}$ August. Anything else I can help with?
    User: Why is it so high? (here, the system detects intent (balance_why_so_high).

"Balance_inquiry" would be a context and might persist across several turns. Unless cleared, it would remain the active context. Another intent may be present that isn't retained across turn. For example, there could be recognition phrases for that intent as:
    intent balance_why_so_high?
    why is it so high?
    why is my account balance so high?

The logic may be captured as:

```
tree balance_inquiry_2:
    condition: intent_balance_inquiry
    fallback:
        sequence:
            condition: is_not_set (balance)
            tree: account_id_verification
            action: balance=lookup_balance(account_id)
            action: utter_balance(account_id, balance)
            action: utter_anything_else
        sequence:
            condition: is_set(balance)
            condition: intent_balance_why_so_high
            action: utter_dont_know_why
            tree: offer_agent_escalation
```

The above is an example of using an intent within a context. Other examples might imply a true follow on where the system takes the initiative, such as offering finance terms or a special low rate overdraft facility. This might be triggered after the initial inquiry is handled. The balance information and account ID are still present and the follow-on behavior in that sense can be triggered by simply invoking a sub-tree. This is similar to the reference above to trigger an agent escalation.

In another embodiment, a decorator node might be introduced for handling confirmation.
    User: . . . I'm going to make a payment tomorrow at the post office. (The System detects intent (promise_to_pay) and slots (location=post_office, date=tomorrow))
    System: . . . Your current balance is $99. How much are you going to pay?
    User: . . . The full amount.
    System: . . . So, to confirm, you're going to pay the full balance of $99 at the post office tomorrow, is that correct?
    User: . . . Wait, Actually, I'll pay $80. (Note the slightly different confirmation prompt, now that the user is no longer paying the full amount.)
    System: . . . So, to confirm, you're going to pay $80 at the post office tomorrow, is that correct?
    User: . . . Yes. (The system calls a webhook/script to record the "promise to pay").

This has the semantics of invoking the underlying action, and if successful, caching its execution status for the input values at that time. The encoding of this below illustrates how recognition phrases include slots, so that slot assignment can happen. If a slot assignment happens, then the confirm node will check its cache. If the values of the inputs to the underlying inputs change for any reason, the confirmation must be made again.

intent promise_to_pay:
   I'm going to make a payment [Date:payment_date](tomorrow) at the [Location:location](post_office)
Intent inform_repayment_amount:
   I will pay the [String:repayment](full amount)
   Wait, [String:repayment](44)
Tree get_promise_to_pay:
   condition: promise_to_pay
   action: utter_current_balance(balance)
   action: asks(payment_date, location, repayment)
   action: confirm(utter_confirm_promise_to_pay, payment_date, location, repayment)
   action: record_promise_to_pay(payment_date, account_id, location, repayment)

In an embodiment dealing with asynchronous actions, the system starts a back end task/script that is going to take a while. In the meantime, the user can context-switch if they like. This sort of example can be handled with a parallel node to allow for both to be run. For example:

User: . . . I'm going to make a payment of $100 tomorrow at the post office. (the system detects intent (promise_to_pay) and slots (location=post_office, date=tomorrow, amount=$100)

System: . . . So, to confirm, you're going to pay $100 at the post office tomorrow, is that correct?

User: . . . Yes. (System kicks off a webhood/script to record the "promise to pay").

System: . . . Just a moment please while I process that. (Time passes. Here either full duplex communication may occur between the client and the Dialog Engine, or the client keeps polling the DialogEngine every few seconds). Thanks for waiting, shouldn't be much longer.

User: . . . Can you send me a reminder next month when my bill is due? (System detects potential new intent (setup_bill_reminder).

System: . . . Do you want to setup a bill reminder now? We can come back to the payment when you're finished. (If the user says "do it later", the intent may be stored in the backlog so it may be proposed again when the payment is done).

User: . . . Yes Please. (the system puts current intent (promise_to_pay) on the backlog and sets the current intent to setup_bill_reminder).

System: . . . Do you want a reminder by email, SMS, or both?

User: . . . Email is fine (System kicks off a webhook/script to setup the reminder).

System: . . . I'll set that up for you now. Won't be a moment . . . (Time passes). OK, that's all set up. You'll get an email and an SMS message a few days before your net bill is due.

The encoding might look something like this:
tree payment_handling:
   parallel:
     tree: get_promise_to_pay
     sequence
       condition: request_reminder
       tree: setup_reminder In another embodiment, mapping from an intent with slots filled to a subtree may be performed using decorators. For example:

sequence*intent1:
   action: confirm(intent1)
   action: ask(slot1, slot2)
   sequence*:
     action: x=do_action_1(slot1)
     action: y=do_action_2(slot2)
     action: utter_response_23(x, y, slot1, slot2)

The tree will confirm the triggered intent, then execute slot filling as required, and then move into the actions focused on the response. In a compressed version, the semantics of confirming a triggered intent and filling the slots that are the required inputs are present.

sequence*: intent1(slot1, slot2):
   action: x=do_action_1(slot1)
   action: y=do_action_2(slot2)
   action: utter_response_23(x, y, slot1, slot2)

In another embodiment, complex issues may be present. For example, an airline might have requirements for the handling of: login issues, luggage issues, flight status inquiries, special meal requests, seat upgrades, and FAQ Search. The starting point for this domain is a base set of intents for each task, and an overall menu structure for the root tree. Each main task is a branch of the top level.

The main intent may be mapped to a sub tree to handle the details.

behavior_tree main:
   sequence:
     tree memo( ): bt_startup
     fallback:
       fallback catch( ):
         tree: bt_basics
         tree Login_problem: bt_login_problem
         tree Lost_bags: bt_lost_bags
         tree Flight_Status: bt_flight_status
         tree Special_meal: bt_special_meal
         tree Upgrade_Request: bt_upgrade_request
         tree FAQ_Search: bt_faq
         tree Luggage_Issue: bt_luggage
         sequence no_response( ):
           #If we get no response to the user input, try again
           action: say("Sorry, I did not get that")
           tree: speak_menu
       #Handle the exception
     sequence:
       action: reset_state
       action: say("Starting Over")

Wrappers around a main menu may also be applied. The startup behavior should only be run once in the lifetime of the bot. This is achieved using memo( ). In this example:

behavior_tree bt_startup:
Run this once on startup
   action: say("Welcome to airline support")
   action: say("We can help you with a range of support queries")
   action: say("How may we help?")

Generic conversation handling may be used as part of the top-level behavior. This is re-evaluated on each turn. For example:

```
behavior_tree bt_thanks:
    condition: thanks
    action: utter_ack_thanks
behavior_tree bt_menu:
    condition: inquire_menu
    tree: speak_menu
#This menu is broken out as we can invoke it
#in several locations
behavior_tree speak_menu:
    action: say("I can book flights, check flight info and
        handle reservation changes."
    action: say("I also deal with luggage issues and common
        questions.")
    action: offer_help
behavior_tree bt_greet:
    condition: inform_name
    action: greet
```

```
behavior_tree bt_basics:
    fallback:
        tree: bt_menu
        tree: bt_greet
        tree: bt_thanks
```

The main menu structure (a fallback node) is wrapped with a catch decorator. Any exceptions raised and not caught in lower levels will trigger a failure and cause a fallback to an error handler. The catch all error handling behavior just resets the state and messages the restart:

```
Sequence:
    action: reset_state
    action: say("Starting Over")
```

Subtrees may also be mapped to a simple debug statement. For example:

```
behavior_tree bt_lost_bags:
    Action: say(Lost_Bags)
```

Below is another example of a behavior tree for handling login problems:

```
behavior_tree bt_login_problem:
    - sequence*:
        - action: say("We can help customers reset their passwords")
        - fallback retry(count=3)
            - action not(dont_know): ask(account_number)
            - sequence*:
                - action: say("We can get your account from your email address")
                - tree: bt_lookup_by_email
behavior_tree bt_lookup_by_email:
    - sequence*:
        - fallback:
            - sequence retry(count=3, retry_message="sorry, could not match email"):
                - action: ask(email)
                - fallback:
                    - action: account number =
                        lookup_by_email(email=email)
                    - sequence fail:
                        - action: debug(message=email)
                        - action: clear_slot(email)
            - tree: bt_agent_transfer
behavior_tree test_bt_lookup_by_email:
    - tree catch( ): bt_lookup_by_email
```

There are also several points where the option of an agent transfer may be offered. The behavior tree below specifies this behavior. This may be wrapped with a retry loop. In another embodiment, an abort behavior may also be used as a fallback to close the conversation and throw an exception. Implementation of the agent transfer uses standard dialog acts (intents) to capture affirmation and negation. These are defined with recognition phrases. Abstracting this into intents makes it language agnostic and robust to variances in expression.

```
behavior_tree bt_agent_transfer:
    - fallback:
        - sequence* retry(count=3, retry_message= "Sorry I could not get that"):
            - action: answer = ask_yes_no ("Would you like to be transferred to an
                agent?")
            - fallback:
                - sequence eq(answer, YES):
                    - action: say("Transferring now. Goodbye from me. ")
                    - action: transfer_to_agent
                - tree eq(answer, NO): bt_abort
        - tree: bt_abort
behavior_tree bt_abort:
    - action: say("Sorry I could not help you this time. Goodbye. ")
    - action: throw( )
```

Some examples of uses of the behavior trees within a dialog engine could comprise AI support to agents in real-time interactions with customers over voice and digital channels. Examples might be to provide real-time sales coaching for debt collections or churn prevention.

In an embodiment, there could be blended interactions of self-service and agent service. A customer has an account with a bank. The customer recently came into some money and deposited a sum of $30,000 into their checking account. Having significant excess funds in a deposit account is a great opportunity for the bank to add some value and offer a special savings account to the customer. The Customer now fits the profile of such a customer because he has more than 5 times (or some other threshold) his monthly outgoing in his checking account. The bank would see a flag and the customer may be added to a campaign, such as for a savings account or maybe a mortgage interest rate special. The Customer may be sent a series of offers as part of their monthly communications from their bank. In this example, Customer does not take action from the email and logs into their account several days after the email communication. The customer, who is named Jack in this scenario, is pushed a proactive webchat which might look like this:

- Bot: Hi Jack, I'm your Virtual Assistant. We've noticed you have quite a lot of cash in your checking account. If you don't have immediate plans for those funds, then maybe we can help you get a better return. Would that be of interest to you?
- Jack: Maybe. What kind of return?
- Bot: Our savings products offer up to 4.1% annual return depending on amounts and timescales.
- Jack: What do you mean by timescales?
- Bot: If you commit to leave the money with us for a minimum of 6 months, it helps us get you a better rate for example. Does that make sense?
- Jack: Oh ok.

Here there is no further response from the customer. The Bot may be triggered to continue the interaction with the customer after a certain threshold of time passes.

- Bot: Is that something you'd like to explore? I can check if one of my human colleagues is available if you'd prefer?
- Jack: How much would I earn if I put $20,000 away for 3 months?
- Bot: Checking . . . We can get you an annualized rate of 3.8% if you commit to 3 months. Your total interest earned would be $156.27. That's better than the $0.23 you'll earn in your checking account ;-). Is that interesting to you?
- Jack: HUMAN.
- Bot: Thank you, Jack. I'm checking if one of my human colleagues is available . . . The wait time is about 4 minutes. Can you wait or can I ask someone to call you back?
- Jack: Have them call me.
- Bot: I have 555.555.5555 as your preferred contact number. Is this the best number?
- Jack: Yes.
- Bot: Great. And shall they call you as soon as possible?
- Jack: After 4:30 pm.
- Bot: Ok. Someone will be in touch after 4:30 pm. Is there anything else I can help you with?
- Jack: No. Thanks.
- Bot: Ok. Have a great day!

Here, the self-service aspect of the interaction has ended. Three hours later, an Agent in the contact center, whose name is Jill, is routed a call back request. A transcript of the Bot conversation is available to Jill as well as jack's key Customer Relationship Management data and an appropriate financial summary that respects his privacy but also provides Jill with the information she needs. Jill places a call to Jack. The conversation looks like this:

- Jack: Hello?
- Jill: Mr. Brown? My name is Jill and I'm calling from Bank to follow up on your savings inquiry.
- Jack: Oh—hi yes.
- Jill: I see you have quite a lot of cash resting in your checking account—are you interested in putting some of that to work for you?
- Jack: Yes—if I can get a good rate.

Here, the agent assist aspect is triggered by the term "good rate". Jill will see coaching on her desktop to help her have a successful interaction.

- Jill: We do have some incredibly competitive rates if you can commit to a fixed term deposit of 6 months or more? I see your initial inquiry was for 3 months.
- Jack: I'm a bit worried about locking in for 6 months. What would happen if I needed to get money out sooner?

Another trigger for Jill occurs here with the agent assist aspect: "What about early withdrawal from fixed contract" appears on her desktop. Jill is able to reference this for information.

- Jill: It is always possible to withdraw early but there would be penalties that would reduce the amount earned. However, you'll never end up with less than your original deposit. If you think you will need the money before 6 months, then best not to do it. If you are just worried in case of an emergency, then you do have the option to get your money back out.
- Jack: Oh ok. So what's the rate for 6 months?

Agent assist is triggered here with a rate query.

- Jill: The annualized rate is 4.1% for amounts between $10,000 to $30,000 and 3.8% for amounts more than $30,000.
- Jack: So what would 20k for 6 months get me?

Agent assist is triggered again here with a rate query.

- Jill: That would earn you about $390. It will be a bit less than half because interest is calculated daily. What do you think? Get some return on that cash?
- Jack: Yeah—sounds like a plan.
- Jill: Great—I will send you through an email with the details on how to set it up. Is there anything else I can help you with today Mr. Brown?
- Jack: No. All good. Thanks.
- Jill: You're welcome. Have a great day.

Jack will then receive an email with the details of how to apply. He does so afterwards via the internet banking facility. As a result, Jack is no longer flagged as being on this campaign and he does not receive any more promotions concerning the special savings account rates. In this example, the bot is monitoring the interaction and searching for keywords. The agent is receiving candidate knowledge articles that are highly relevant to the interaction in the agent's user interface at their workstation. In a self-service scenario where a customer is browsing a website but has not connected with an agent, the customer may be offered a chat. The customer is interacting directly with the bot in a discussion. The bot can pull from a repository knowledge base of Q/A pairs in order to direct the conversation and assist the customer.

Figure 10:
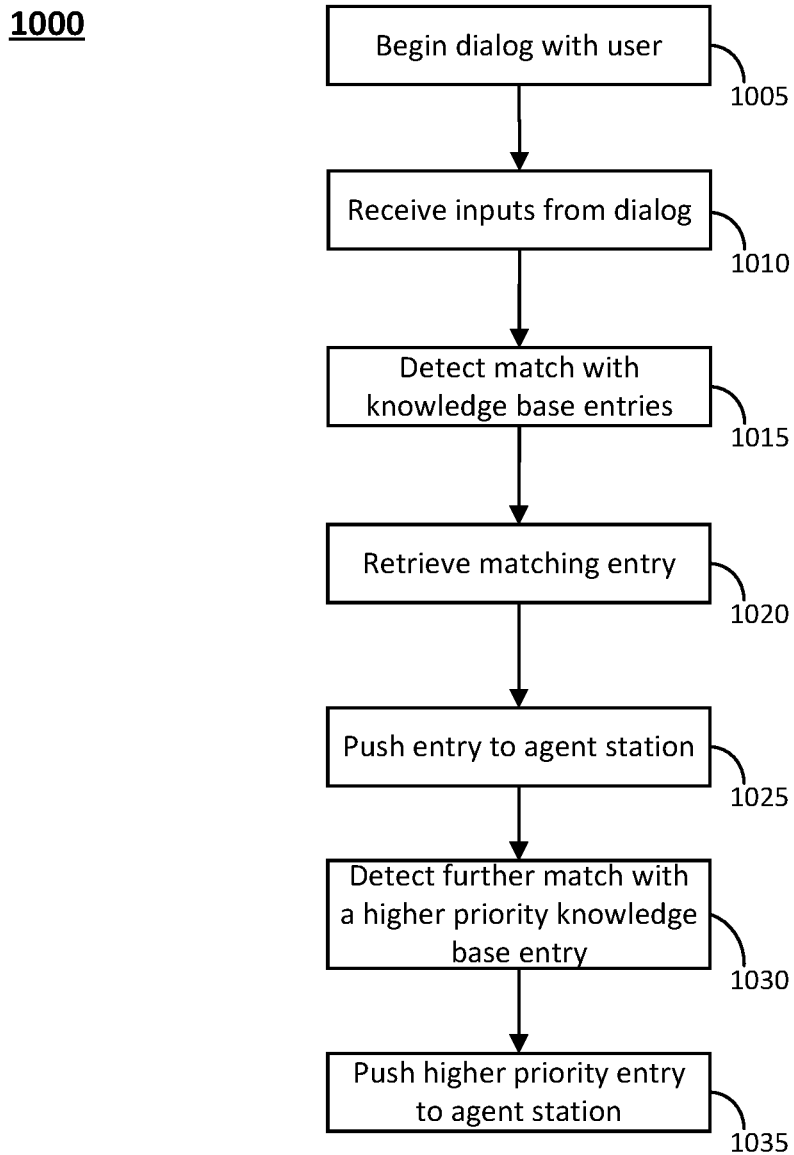
FIG. 10 is a flowchart of supporting an agent of a contact center system engaged in a dialog with a user.

FIG. 10, which is described later, provides additional detail on a method for pushing knowledge base articles to an agent, with new inputs from the customer (as described above) determining higher priority matches from the knowledge base to replace or supplement earlier articles already pushed to the agent.

Another example of blended agent and bot interactions may take the form of a bot being overseen by an agent, with the agent workstation being provided with an interface that allows the agent to monitor the conversation between the bot and the customer, and to control the outputs and responses provided by the bot. While this can be a generalized ability provided to an agent in an always-on fashion (the agent acting as a bot supervisor, and potentially tasked with monitoring several bot instances and conversations), it can be advantageous to have the bot act autonomously by default, with agent supervision and control being triggered in specific instances.

For example, the bot may detect a trigger event from its dialog with the customer, such as if a specific keyword, context or intent is determined to exist, or if an emotion/sentiment metric exceeds a threshold, or if the customer raises her voice (detected as a change in volume or pitch), or if the customer's input either cannot be understood or a satisfactory response cannot be formulated with a high enough confidence level. Any such trigger event may cause a notification to be sent to an agent workstation, which provides a graphical interface allowing the agent to monitor the interaction and review the prior conversation history. The interface may provide the agent with a view into the bot's operation, such as by showing a list of potential responses which the bot has formulated, and allowing the agent to select which response is most appropriate. The bot might be continuing to interact autonomously as normal, or to interact with a short delay in its response time to enable agent override of the next response. Alternatively, the bot might (depending on the trigger event and its severity) pause in its interaction to await agent input, so that it was fully under agent control until the conversation terminates or the agent decides to hand back autonomy to the bot. FIG. 1, which is described later, provides further detail on how this form of blended interaction may be implemented with bot supervision by an agent.

In another example, behavior trees might be used to assess the student level for an online class enrollment. Using Jack again, he might be looking for an after-school education program for his son Junior. Jack is browsing an after-school education web site for ABC Learning Centre. He is trying to find the right program for Junior, but isn't quite sure what level is suitable. The website for ABC Learning Centre, using the embodiments described herein, can observe Jack's on-line activities and recognize intent and relevant subjects. The system determines the time is right to engage Jack in a web chat with an agent, however, all agents are currently busy. Jack can be engaged with a chat bot (service bot) in the meantime. The chat bot suggests that Jack let Junior talk to another bot (the test bot) from his iPad. That test bot can evaluate Junior's skill level. A unique link is sent to Junior's email. Meanwhile the service bot suggests to Jack to continue browsing the website until an agent becomes available. If he has any questions, he can ask the service bot. When the agent becomes available, the test bot has finished the talk with Junior and brings back the result. With all information on hand, it becomes straightforward for Jack to make a decision. The Agent provides a few extra details and can complete the enrollment. Jack and Junior's information are stored for future usage.

In this example, a Behavior tree (BT) session can be created by either an application or by another BT session. In the latter case, the session creating the child session is called the parent session. For the ABC Learning Centre customer journey that Jack is undertaking, the ABC journey session is created by the predictive engagement services running on the website. The service bot session is created by the ABC journey session, and the test bot session is created by the service bot session. The service bot session creates the test bot session passing parameters ('subject') to the child session in its initial context. For example, '-action: student_level=run_bt(test_bot, subject=math)'. Before the test bot accomplishes (or fails) its mission, this action node returns RUNNING state. A randomized string 'session id' is kept in the service bot context, allowing the same 'run_bt( )' action to query child session status (e.g., test not started, 70% done, etc.) despite still being in the RUNNING state. Internally run_bt( ) is handled by heavier engine with the test bot session Id. If the child session is not started yet, the dialog engine returns the 'Not started' immediately. If it is already miming, a system event 'query_child_status' will be sent to the child behavior tree and optionally get more precise status. 'run_bt( )' adds the child session status in parent BT output.

When the child session completes its mission (test bot finishes the skill assessment), the session terminates. The dialog engine collects the relevant states (in the case 'student level') from the child BT context account to run_bt( ) signature and generates another system event 'post-child_status' to the parent BT. This leads run_bt( ) to return SUCCESS and sets the 'student_level' slot. It is similar for a case of FAILURE.

Action 'run_bt( )' creates a new BT session ready to be executed. The child BT 'session_id' will be returned to the parent BT in the output. Variants may also be used if the new BT session needs to be executed from another device. For example, '-action: student_level=run_bt_from_email(test_bot, email=student_email, subject=math). A URL of the dialog engine service that contains the test bot BT session ID will be sent to the student's email address (or in the case above, Junior's).

In an embodiment, the dialog engine may propagate the result (student_level_to its closest ancestor if the child BT session has a longer life-span than the parent BT session.

In another embodiment, the ABC Learning Centre website might have information about Jack from an account Jack has with the website, providing for pre-populated slots when the service bot is created. The service bot may also bring back various information valuable to the journey service. A variant might be used such as '-action: run_bt(service_bot, input=dict, output=dict)'. The dialog engine can map the slot names between the ABC journey context and the service bot context according to the input and output dictionaries.

In another embodiment, the agent assistant technology might be used for employee onboarding. For example, when an employee embarks on a new position in a contact center, the first few days and weeks may be stressful. There is a statistically high likelihood of churn. Employees (or agents) need to familiarize themselves with systems and processes, and the product/service the company is offering needs supporting. A bot may be used here as the systems guide for the agent from the very first day.

In another embodiment, employees may not have the time to click through workforce management systems or processes to make requested adjustments. The assistant can interact with the workforce management platform to understand when changes can be made, such as identifying when an employee might be able to leave early or when they might make up time. This may be done using pre-built rules which automatically approve changes without the need for clicking through a workflow. In another example of workforce management, overtime might be managed through having the assistant navigate the needs of overtime with employees directly, including the facilitation of the request and processing of the change to the schedule.

In another embodiment, employee feedback may be garnered. For example, the assistant might monitor interactions of agents and customers. These can be compared against standard interactions of a similar type. If issues arise, the agent might be prompted for feedback on that interaction type for use in predictive routing and coaching programs. The assistant might also understand where problems arise in previous interactions and based on employee feedback, allocate coaching and development material for improvement of the agent. These can be automatically routed to the agent after the next interaction or at a specified time.

In another embodiment, bots might also be used to automate employee wrap-up of interactions by automatically completing tasks post interaction that are consistent (e.g., wrap-up codes, automatically placing the employee in break codes, transcribing notes, etc.)

In yet another embodiment, employees might struggle to remember every campaign or consume every piece of information about the customer. The assistant can process information much faster and uncover hidden details by leveraging journey analytics. The bot can advise on where the customer is in a journey and what the next best step might be. For example, the bot might provide the agent with information about Jane like: "she called last week and wasn't happy with the outcome. Even though Jane is a campaign target, her NPS is really low. Let's focus on her problem. Remember to remind Jane that she can get access to this information online here", where a link may be provided. Other information may be provided. For example: "Last week, Jane viewed our new credit card on our website, remember to talk about the 'product'. Jane has been selected for a 4% discount. She also has a son, Rick, you might want to talk to her about starting an account for him too".

In another embodiment, a bot might be used for process compliance. For example, employees sometimes fail to complete compliance requirements during interactions. The assistant can listen into the interaction and track its state to make sure the scripts and processes are complied with.

In yet another embodiment, the assistant can track performance of an agent across multiple days or periods of time. The assistant can prompt employees to focus on key areas, such as "our handle time yesterday was a little higher than normal, lets focus on this today" or "We finished $3^{rd}$ on the performance table yesterday".

FIG. 9 is an example of a flowchart 900 of an embodiment of a method for managing a dialog in a contact center which employs intent detection and context switching. In step 905, a dialog is started with a user of the contact center. The dialog may be with an automated system of the contact center or with an agent via the agent's communication equipment such as a workstation and/or voice or video telephony set. The system receives inputs from the dialog and sets an intent, step 910, and executes a root behavior tree 915 to manage the dialog, which tree has at least one first-level behavior tree executed in turn, step 920. The behavior trees manage the dialog such as by providing outputs causing appropriate responses to be generated to the user via an automated component or causing appropriate prompts to be provided to an agent workstation, step 925. Other outputs might include conferencing in other agents, supervisors or services; switching the communication to another component or service of the contact center; opening a new communication channel with the user; performing a transaction with the user; providing media to the user, and so on.

In step 930, a pattern of data is detected in the inputs from the dialog which are determined to be indicative of a new intent, i.e. requiring execution of actions or tasks not currently contemplated or catered for by the behavior tree's current execution state. In another embodiment, it may be determined if there is anything left in the backlog. If a conversation is still going, then the process may loop back to 910, however, if a conversation is not occurring, then the process may end at stop 930.

In step 935, the sequence of execution is altered in response to the newly detected intent. This can take place immediately or can be deferred, such as by recording the intent in a stack and then when a current task is completed, switching execution according to the next intent in the stack. In step 940, new actions, consistent with the altered execution sequence, are output to a component of the contact center, which may be the same or different than the component(s) to which actions were previously output, with the result that the communication with the user is adapted to cater for and respond to the new intent.

FIG. 10 is a flowchart 1000 of a method of supporting an agent of a contact center system engaged in a dialog with a user. In step 1005, a dialog is started between a user of the contact center and a contact center agent. The system receives inputs from the dialog, step 1010, and continually interprets the inputs by matching them against a knowledge base. When a match is detected with an entry in the knowledge base, step 1015, this indicates that the agent may be assisted by the knowledge base entry or article. Therefore, in step 1020 the matching entry is retrieved, and in step 1025 the entry is pushed to the agent workstation. It will be appreciated that depending on how the system is implemented and on the number and relevance of the matches detected, as well as the business rules according to which knowledge base entries are to be provided to an agent (such as for example if there is a current promotion or campaign prioritizing that the conversation be driven in a specific direction), more than one knowledge base entry can be provided to the agent station. The knowledge base entry(ies) may be presented in a concise form to allow the agent to readily perceive the content and relevance of each, such as by showing the agent a list of knowledge base titles and perhaps a snippet of the entry from which the agent can understand the context in which it has been selected for presentation.

As the conversation continues, the system continues to look for matches with knowledge base entries based on both new inputs and the aggregation of inputs in context. In step 1030, the system detects a further match with a higher priority knowledge base entry (or entries). The higher priority entry is pushed to the agent station in step 1035. This higher priority may be determined from a priority rating built into the knowledge base or may be determined dynamically with priorities changing according to the progress of the conversation and the specifics of the customer. As an example, a priority of an already-presented knowledge base entry may be reduced once the agent has accessed it or dismissed it (both indicating that the agent has no further use for the entry. Priorities may be ranked according to an expected progression of a typical interaction, e.g. towards the start of a conversation higher priority may be given to more general information explaining various offers, while later in the conversation higher priority may be given to entries that assist in closing a sale. As another example, in a PC manufacturer's technical support contact center, a suggestion to check for an update to a specific device driver might be prioritized at a very low level during the initial exchanges, but its priority might be progressively increased as the conversation develops and the earlier diagnostic steps make it more likely that the device driver is the cause of the problem.

Figure 11:
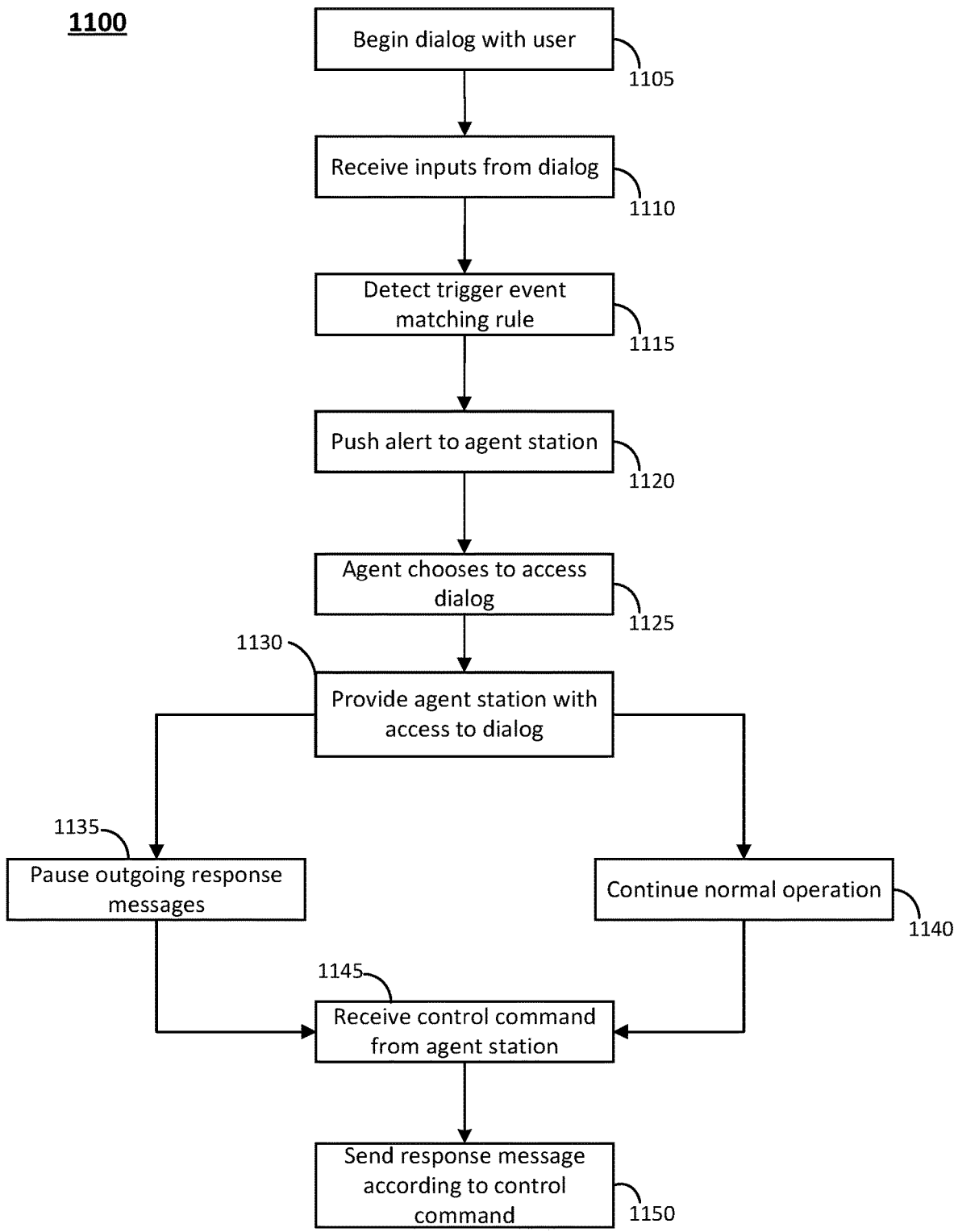
FIG. 11 is a flowchart of a method for managing a dialog between a contact center system and a user thereof.

FIG. 11 is a flowchart 1100 of a method for managing a dialog between a contact center system and a user thereof.

In step 1105, a dialog is started between a user of the contact center and an automated dialog engine of the contact center. The system receives inputs from the dialog, step 1110, and in its normal mode of operation will autonomously provide responses to the user. The automation of the responses and the interpretation of inputs may be implemented as previously described herein—or using any other suitable system for automated interactions with a contact center customer or user.

In addition to providing automated response to inputs, the system maintains a set of rules defining trigger events. Some non-limiting examples of trigger events would include: determining a keyword in one or more input messages; determining a sentiment in one or more input messages; determining a change in speaking volume or pitch; determining that an input message cannot be properly interpreted; determining that a response message cannot be determined in response to an input message; determining that a confidence level associated with a potential response message is below a predetermined threshold; determining that one or more input messages relate to a topic for which agent intervention has been defined as mandatory; determining that one or more input messages relate to a topic for which agent intervention has been defined as preferable; and determining that agent intervention has been requested by said user of said contact center. In step 1115 a trigger event is detected matching such a rule.

Following detection of the trigger event, the system pushes an alert to an agent station, step 1120. This may suitably be an agent designated as a bot supervisor. The agent may have oversight or responsibility for several bot-customer interactions (either alone or as part of a pool of bot supervisors). Where there are several agents with responsibility for bot supervision the alert may be pushed to a selected one of the agents or to all agents allowing any of them to handle the alert.

In step 1125, the agent responds to the alert by choosing to access the dialog between the bot and the customer. This may be in order to identify the reason for the triggering of the alert (if this was not flagged in the alert itself), or more commonly to understand whether the trigger event actually requires any intervention. The agent is provided with access in step 1130, and can access the dialog in real time, or access a history of the dialog. Depending on the communication type the agent may be able to fast-forward/rewind the dialog, and the record of the dialog itself (i.e. the actual messages sent by the customer to the bot and vice versa) may be supplemented by metadata including timestamps, contexts, intents, transcriptions, and a record of bot processing (for example, for each response from the bot the agent may be able to look behind the actual response and see why it was chosen, or perhaps see other responses that were considered and not chosen). Indeed, any information that is considered helpful to the agent to diagnose and rectify an issue in the interaction may be suitably provided.

Following the alerting and the agent accessing the dialog, the automated dialog engine can either pause in the provision of outgoing messages to await input from the agent (step 1135) or may continue to operate normally with autonomous responses continuing to be given to the customer (step 1140). If autonomous operation is employed, then this may be modified to introduce a pause allowing the agent to intervene or not, but without needlessly halting the conversation if the agent is either too busy to intervene or determines that no intervention is required (bearing in mind that the same agent may be looking at several bot conversations at the same time).

If the agent chooses to intervene following step 1140 or is forced to intervene in order to provide a response following step 1135, the agent's intervention is received as a command from the agent station, step 1145. Typically, this is the selection of a response from a list of possible responses suggested by the bot, or the inputting of a bespoke response, or the selection of a response from a list of "canned" responses available in the agent's interface. In some scenarios, the command may cause the conversation to be transferred from the bot to a human agent of the contact center or another automated system. However, in the context of FIG. 11, the agent's intervention guides the bot to send an appropriate response, step 1150. The agent may choose to terminate the supervision of the conversation at any time, e.g. without sending any control commands, after instructing a single response as in step 1150, or the agent could remain connected to the conversation, continuing to monitor and direct the bot's responses until the conversation terminates or a determination is made that no further assistance to the bot is needed.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 12A, 12B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 12A:
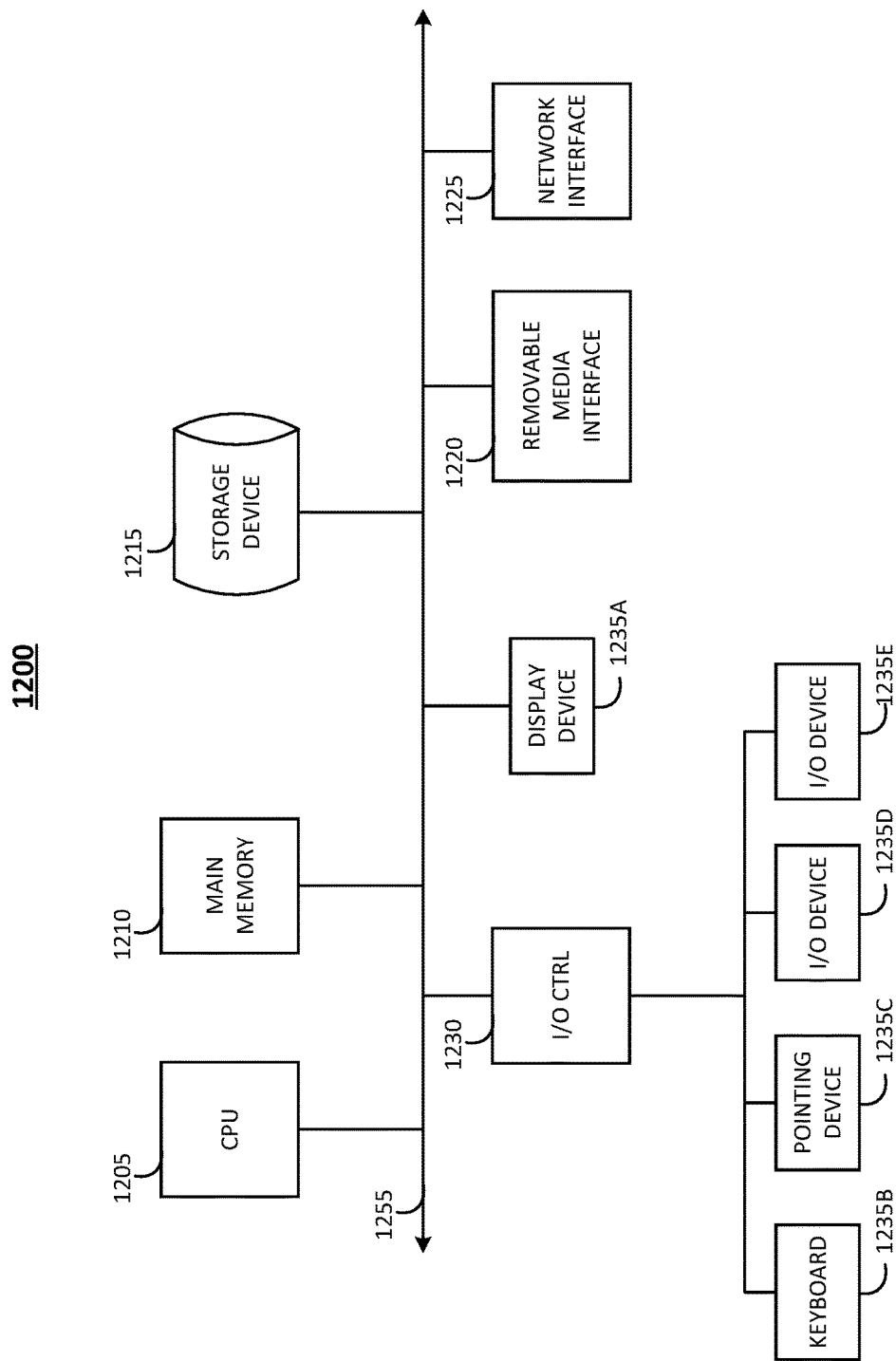
FIGS. 12A and 12B are diagrams illustrating an embodiment of a computing device as may be employed in an embodiment of the invention.
Figure 12B:
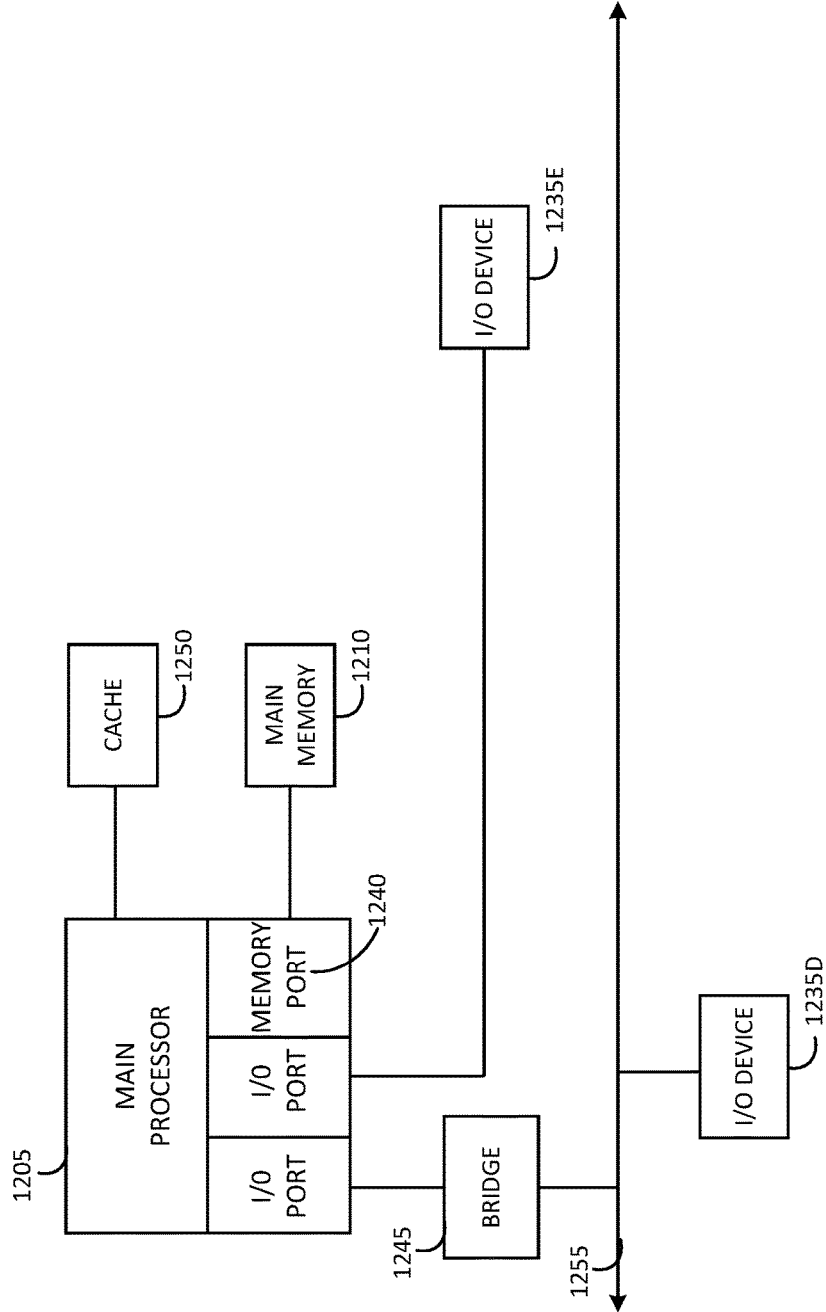

FIGS. 12A and 12B are diagrams illustrating an embodiment of a computing device as may be employed in an embodiment of the invention, indicated generally at 1200. Each computing device 1200 includes a CPU 1205 and a main memory unit 1210. As illustrated in FIG. 12A, the computing device 1200 may also include a storage device 1215, a removable media interface 1220, a network interface 1225, an input/output (I/O) controller 1230, one or more display devices 1235A, a keyboard 1235B and a pointing device 1235C (e.g., a mouse). The storage device 1215 may include, without limitation, storage for an operating system and software. As shown in FIG. 12B, each computing device 1200 may also include additional optional elements, such as a memory port 1240, a bridge 1245, one or more additional input/output devices 1235D, 1235E, and a cache memory 1250 in communication with the CPU 1205. The input/output devices 1235A, 1235B, 1235C, 1235D, and 1235E may collectively be referred to herein as 1235.

The CPU 1205 is any logic circuitry that responds to and processes instructions fetched from the main memory unit 1210. It may be implemented, for example, in an integrated circuit, in the form of a microprocessor, microcontroller, or graphics processing unit, or in a field-programmable gate array (FPGA) or application-specific integrated circuit (ASIC). The main memory unit 1210 may be one or more memory chips capable of storing data and allowing any storage location to be directly accessed by the central processing unit 1205. As shown in FIG. 12A, the central processing unit 1205 communicates with the main memory 1210 via a system bus 1255. As shown in FIG. 12B, the central processing unit 1205 may also communicate directly with the main memory 1210 via a memory port 1240.

In an embodiment, the CPU 1205 may include a plurality of processors and may provide functionality for simultaneous execution of instructions or for simultaneous execution of one instruction on more than one piece of data. In an embodiment, the computing device 1200 may include a parallel processor with one or more cores. In an embodiment, the computing device 1200 comprises a shared memory parallel device, with multiple processors and/or multiple processor cores, accessing all available memory as a single global address space. In another embodiment, the computing device 1200 is a distributed memory parallel device with multiple processors each accessing local memory only. The computing device 1200 may have both some memory which is shared and some which may only be accessed by particular processors or subsets of processors. The CPU 1205 may include a multicore microprocessor, which combines two or more independent processors into a single package, e.g., into a single integrated circuit (IC). For example, the computing device 1200 may include at least one CPU 1205 and at least one graphics processing unit.

In an embodiment, a CPU 1205 provides single instruction multiple data (SIMD) functionality, e.g., execution of a single instruction simultaneously on multiple pieces of data. In another embodiment, several processors in the CPU 1205 may provide functionality for execution of multiple instructions simultaneously on multiple pieces of data (MIMD). The CPU 1205 may also use any combination of SIMD and MIMD cores in a single device.

FIG. 12B depicts an embodiment in which the CPU 1205 communicates directly with cache memory 1250 via a secondary bus, sometimes referred to as a backside bus. In other embodiments, the CPU 1205 communicates with the cache memory 1250 using the system bus 1255. The cache memory 1250 typically has a faster response time than main memory 1210. As illustrated in FIG. 12A, the CPU 1205 communicates with various I/O devices 1235 via the local system bus 1255. Various buses may be used as the local system bus 1255, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 1235A, the CPU 1205 may communicate with the display device 1235A through an Advanced Graphics Port (AGP). FIG. 12B depicts an embodiment of a computer 1200 in which the CPU 1205 communicates directly with I/O device 1235E. FIG. 12B also depicts an embodiment in which local buses and direct communication are mixed: the CPU 1205 communicates with I/O device 1235D using a local system bus 1255 while communicating with I/O device 1235E directly.

A wide variety of I/O devices 1235 may be present in the computing device 1200. Input devices include one or more keyboards 1235B, mice, trackpads, trackballs, microphones, and drawing tables, to name a few non-limiting examples. Output devices include video display devices 1235A, speakers and printers. An I/O controller 1230 as shown in FIG. 12A, may control the one or more I/O devices, such as a keyboard 1235B and a pointing device 1235C (e.g., a mouse or optical pen), for example.

Referring again to FIG. 12A, the computing device 1200 may support one or more removable media interfaces 1220, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1235 may be a bridge between the system bus 1255 and a removable media interface 1220.

The removable media interface 1220 may, for example, be used for installing software and programs. The computing device 1200 may further include a storage device 1215, such as one or more hard disk drives or hard disk drive arrays, for storing an operating system and other related software, and for storing application software programs. Optionally, a removable media interface 1220 may also be used as the storage device. For example, the operating system and the software may be run from a bootable medium, for example, a bootable CD.

In an embodiment, the computing device 1200 may include or be connected to multiple display devices 1235A, which each may be of the same or different type and/or form. As such, any of the I/O devices 1235 and/or the I/O controller 1230 may include any type and/or form of suitable hardware, software, or combination of hardware and software to support, enable or provide for the connection to, and use of, multiple display devices 1235A by the computing device 1200. For example, the computing device 1200 may include any type and/or form of video adapter, video card, driver, and/or library to interface, communicate, connect or otherwise use the display devices 1235A. In an embodiment, a video adapter may include multiple connectors to interface to multiple display devices 1235A. In another embodiment, the computing device 1200 may include multiple video adapters, with each video adapter connected to one or more of the display devices 1235A. In other embodiments, one or more of the display devices 1235A may be provided by one or more other computing devices, connected, for example, to the computing device 1200 via a network. These embodiments may include any type of software designed and constructed to use the display device of another computing device as a second display device 1235A for the computing device 1200. One of ordinary skill in the art will recognize and appreciate the various ways and embodiments that a computing device 1200 may be configured to have multiple display devices 1235A.

An embodiment of a computing device indicated generally in FIGS. 12A and 12B may operate under the control of an operating system, which controls scheduling of tasks and access to system resources. The computing device 1200 may be running any operating system, any embedded operating system, any real-time operating system, any open source operation system, any proprietary operating system, any operating systems for mobile computing devices, or any other operating system capable of running on the computing device and performing the operations described herein.

The computing device 1200 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1200 may have different processors, operating systems, and input devices consistent with the device.

In other embodiments, the computing device 1200 is a mobile device. Examples might include a Java-enabled cellular telephone or personal digital assistant (PDA), a smart phone, a digital audio player, or a portable media player. In an embodiment, the computing device 1200 includes a combination of devices, such as a mobile phone combined with a digital audio player or portable media player.

A computing device 1200 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 1200 communicates with other computing devices 1200 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computer-implemented method of supporting an agent of a contact center system engaged in a dialog with a user, comprising the steps of:
   a. receiving, by a processor, inputs from a dialog performed over a communication channel between said agent and said user;
   b. storing a knowledge base comprising a plurality of entries wherein a subset of said entries are defined as higher priority entries;
   c. detecting, by said processor, a match between an input from said dialog and a plurality of said knowledge base entries;
   d. retrieving at least one of said plurality of entries corresponding to said match;
   e. pushing said at least one of said plurality of entries as an output to one or more of a device operated by said user and at least one device operated by one of said user and said agent;
   f. detecting, by said processor, a further match between an input from said dialog and a higher priority entry in said knowledge base; and
   g. pushing said higher priority entry to said at least one device while the dialog is ongoing.

2. The method of claim 1, wherein said higher priority entry comprises one or more prompts to said device directed to achieving a defined goal.

3. The method of claim 2, wherein said at least one device is a device used by said agent, wherein said one or more prompts coach the agent to achieve a defined goal.

4. The method of claim 3, further comprising said processor continuing to receive inputs from said dialog and pushing updated prompts to said at least one device in response to further detected inputs, thereby coaching the agent through the dialog.

5. The method of claim 1, wherein a behavior tree is defined to implement the detection of matches in steps (c) and (f), said behavior tree executing throughout the duration of the dialog and receiving inputs from said dialog, whereby a match detected in step (f) causes processing within the behavior tree to transfer from one node of the tree to another node of the tree.

6. A system for supporting an agent of a contact center system engaged in a dialog with a user, the system comprising:
- a processor; and
- a memory, wherein the memory stores instructions that, when executed by the processor, cause the processor to:
  a. receive inputs from a dialog performed over a communication channel between said agent and said user;
  b. access a knowledge base comprising a plurality of entries wherein a subset of said entries are defined as higher priority entries;
  c. detect a match between an input from said dialog and a plurality of said knowledge base entries;
  d. retrieve at least one of said plurality of entries corresponding to said match;
  e. push said at least one of said plurality of entries as an output to one or more of a device operated by said user and a device operated by said agent;
  f. detect a further match between an input from said dialog and a higher priority entry in said knowledge base; and
  g. push said higher priority entry to a device operated by said agent while the dialog is ongoing.

7. The system of claim 6, wherein the higher priority entry comprises one or more prompts to said device directed to achieving a defined goal.

8. The system of claim 6, wherein said at least one device is a device used by said agent, wherein said one or more prompts coach the agent to achieve a defined goal.

9. The system of claim 8, wherein the memory further stores instructions that, when executed by the processor, cause the processor to continue to receive inputs from said dialog and pushing updated prompts to said at least one device in response to further detected inputs, thereby coaching the agent through the dialog.

10. The system of claim 6, wherein a behavior tree is defined to implement the detection of matches in steps (c) and (f), said behavior tree executing throughout the duration of the dialog and receiving inputs from said dialog, whereby a match detected in step (f) causes processing within the behavior tree to transfer from one node of the tree to another node of the tree.

* * * * *